(12) United States Patent
Huntington et al.

(10) Patent No.: US 8,391,609 B2
(45) Date of Patent: Mar. 5, 2013

(54) METHOD OF MASSIVE PARALLEL PATTERN MATCHING AGAINST A PROGRESSIVELY-EXHAUSTIVE KNOWLEDGE BASE OF PATTERNS

(76) Inventors: Stephen G. Huntington, Cedar Hills, UT (US); Bevan Rowley, Lehi, UT (US); E Derek Rowley, Olympia, WA (US)

( * ) Notice: Subject to any disclaimer, the term of this patent is extended or adjusted under 35 U.S.C. 154(b) by 414 days.

(21) Appl. No.: 12/711,108

(22) Filed: Feb. 23, 2010

(65) Prior Publication Data

US 2010/0215277 A1 Aug. 26, 2010

Related U.S. Application Data

(60) Provisional application No. 61/208,401, filed on Feb. 24, 2009.

(51) Int. Cl.
*G06K 9/46* (2006.01)

(52) U.S. Cl. ........ 382/194; 382/118; 382/100; 382/135; 382/298; 382/299; 382/251; 382/102; 382/101; 382/181; 348/222.1; 348/348; 348/347

(58) Field of Classification Search .................. 382/194, 382/118, 100, 135, 298, 299, 251, 102, 101, 382/181; 348/222.1, 345, 347
See application file for complete search history.

(56) References Cited

U.S. PATENT DOCUMENTS 7,231,059 B1 * 6/2007 Miyake ...................... 382/100
8,169,530 B2 * 5/2012 Nakahara .................... 348/345

* cited by examiner

*Primary Examiner* — Mike Rahmjoo

(57) ABSTRACT

A method of pattern and image recognition and identification includes building a data store of known patterns or images having known attributes and comparing those patterns to unknown patterns. The data store and comparison processing may be distributed across processors. A digital pattern recognition engine on each of the processors has the ability to compare a known pattern from the data store and an unknown pattern and compare the two patterns to determine whether the patterns constitute a match based on match criteria. If the comparison indicates a match, the match may be communicated to the data store and added as a known pattern with detected attributes to the data store. If the comparison does not indicate a match, the pattern may be flagged, transmitted to manual recognition, or further processed using character thresholding or cutting or slicing the pattern.

7 Claims, 18 Drawing Sheets

METHOD OF MASSIVE PARALLEL PATTERN MATCHING AGAINST A PROGRESSIVELY-EXHAUSTIVE KNOWLEDGE BASE OF PATTERNS

CROSS-REFERENCE TO RELATED APPLICATION

This application claims priority based on U.S. Provisional Patent Application Ser. No. 61/208,401 filed Feb. 24, 2009 and titled "Systems and methods of thresholding, handwriting recognition, hand print recognition, and machine print recognition on digitized document image files, and other forms of recognition on other image data types," the disclosure of which is hereby incorporated by reference.

BACKGROUND

This application discloses a method of pattern recognition, and in particular of character and word recognition for handwriting cursive, hand printing, machine print and digital images.

To date, handwriting and machine print recognition technologies have had accuracy limitations due to computer hardware constraints that forced run-time code into very small footprints. When a new print style, font style, or handwriting style or anomaly was encountered, the recognition source code typically had to be re-written, re-compiled, and re-distributed to users. Even today's institutions of higher learning promote curricula, masters and doctoral degrees, and related research and development departments based upon small footprint practices.

Today there is a vast amount of computer RAM, storage, and parallel processing power available. Indications are the future will continue to bring even greater parallel computing hardware capabilities at lower cost. The blade server industry may soon produce a single blade or single circuit board containing one thousand floating point processors. Unfortunately, methods taking advantage of this and greater levels of distributed and massive parallel processing, caching and storage speed/capacity capabilities to perform Optical Character Recognition (OCR) and Intelligent Character Recognition (ICR) and Intelligent Word Recognition and Intelligent Handwriting Recognition have not been developed. Furthermore, being able to adapt to new character and word anomalies, font styles, and attributes without re-writing of the underlying source code would also be a useful advance over prior technologies.

SUMMARY

The present method uses massively parallel distributed computing hardware and software technologies coupled with improved algorithms. The present method incorporates massively parallel distributed server nodes networked with fast networking hardware to perform the calculations needed for character recognition across a massive database of existing, known text. Such a database continues to grow and update to store practically every pattern possibility for all characters and words. The more the database grows, the greater are its varieties of patterns it can recognize. Furthermore, the present method incorporates improved recognition algorithms to also help reduce the error rate that has previously been inherent in the OCR process.

The method uses a mass storage knowledge base of intelligent data records. The records are a collection of images that have previously been recognized and, typically, parsed into known individual characters and words (handwritten, hand cursive, hand print, or machine print, for spoken languages and corresponding alphabet types), together with related and associated metadata and attribute data. The database of records is therefore a repository of known pixel patterns and dot patterns of scanned images.

When processing an unknown character in a digital image, the method compares pixels/dots from the unknown image to the known pixel/dot patterns in the knowledge base, using the massively parallel processing, to identify text or characters in the unknown image. The comparison may be on a pixel/dot by pixel/dot basis or on a larger scale basis; often both methods are used. The comparison may involve rotation, distortion and other manipulation of the unknown image or the known image (or both) to identify characters or words. Once text (such as individual character or collections of characters or words or sentences or more) is identified, other attributes and metadata are associated with the recognized text, and the image, text and other information may be added to the knowledge base for future use and comparisons.

BRIEF DESCRIPTION OF THE DRAWINGS

Other features and advantages of the present apparatus are apparent from reference to specific embodiments as presented in the following Detailed Description taken in conjunction with the accompanying Drawings, in which.

DETAILED DESCRIPTION

Figure 20:
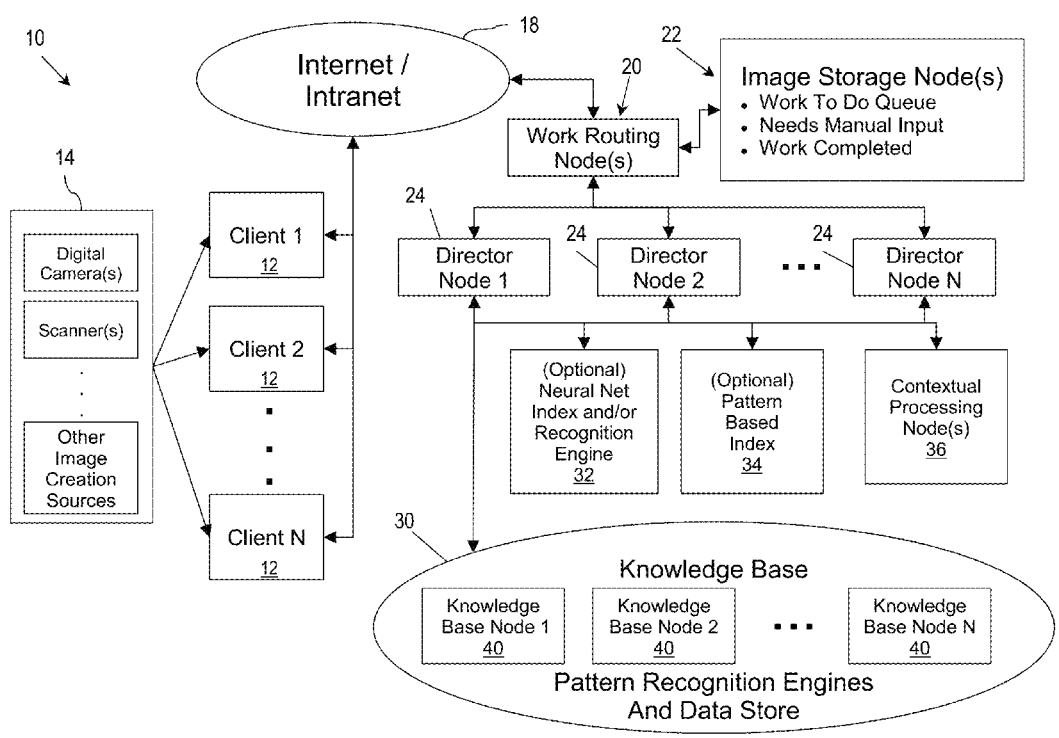
FIG. 20 is a schematic overview of an exemplary configuration of a computer network and component parts in which one embodiment of the present method may be practiced.

The present method is preferably employed in a distributed network of a large number of client computers and server computers. For example, as depicted in FIG. 20, a networked environment 10 includes a plurality of clients 12, which clients may be stand-alone computers or servers performing similar operations. Each of the clients 12 accepts images from various image acquisition sources 14, which may include such devices as digital cameras, scanners, fax machines, or other image creation devices or sources. The clients have connections to a computer network 18, which may be the Internet, an intranet, LAN, or a direct link to a work routing node 20.

The work routing node or nodes 20 is typically a stand-alone server or servers or a process or processes on a server or servers that allows client connections from which images are collected. The routing node 20 has one or more image storage nodes 22 in which incoming images may be stored. The routing node or nodes 20 thereby essentially creates a "work to do" queue of unprocessed images. When processing power is available, the routing node or nodes 20 sends images from the queue to one of a plurality of director nodes 24.

Upon receipt of an unprocessed image, the director node 24 may convert the image to a Cartesian coordinate system, convert the image to grayscale or black and white, de-skew, rotate or crop the image, cut the image into possible characters, words or sentences, scale portions or all of the image, or perform other operations intended to assist in processing the image. The director node 24 routes the image to a pattern recognition engine 30. Prior to doing so, the director node 24 may optionally make use of a neural net index 32 or a pattern based index 34 to route the image. While and after the image is being or has been processed, the director node 24 may employ a contextual processing node 36 to aid in the recognition process, if necessary information about the image is available.

The pattern recognition engine 30 compares the unknown image to known images that have previously been stored in a knowledge base. The engine 30 typically includes a plurality of knowledge base nodes 40 that are used for pattern recognition. The mechanics of this comparison are described in more detail below. However, in essence, the engine 30 compares the unknown image to the known patterns stored in the knowledge base to find a match, based on attributes derived from previous processing or other various criteria. Upon finding a match, the recognition engine 30 may send the image (if requested by the director node for progressive feedback) along with the matched pattern's character code or codes back to the director node 24 for possible future processing. Ultimately, the "recognized" image may be stored back into the knowledge base as a known pattern entity for use in subsequent comparisons.

The director node 24 may also take a processed image and put it into a queue for further processing (for example, if the image simply could not be recognized or was only partially recognized, the image may be placed in a list for further manual processing), or may flag the image as having been "work completed" if that is the case. If the image is flagged as needing further manual processing, the image may be again provided to a client 12, for a person to identify the image or provide additional information about the image, at which point the image may again be submitted for pattern recognition as described.

Certain key elements used in the method may now be described. The knowledge base is preferably a massive distributed parallel knowledge base. In other words, a mass storage knowledge database, preferably having a very large size, is capable of performing complete database linear or parallel searches or both, processing, calculations, computations, and other operations simultaneously. This knowledge base may be implemented on massively parallel distributed storage servers, that have several available processors and as much dedicated RAM per processor as feasible.

The servers preferably have a large amount of system RAM to facilitate caching of large portions of the knowledge base and any index information, and also have multiple hard drives that are controlled by RAID (Redundant Array of Independent Disks) controllers or other disk array technologies, solid state disks, or other storage technologies available. To facilitate large volume storage, additional storage server nodes may be added. An alternative embodiment may employ a single workstation with large capacity high performance hard drives, a wide expansion bus and multiple parallel CPU processors with large amounts of RAM. Typically, the method will work better if larger amounts of fast RAM are available for use. The more parallel and distributed the data seek process, the faster the knowledge base searches typically are.

The dot pattern knowledge base recognition engine 30 preferably contains a complete instance of the pixel/dot patterns for a vast array of digitized images, scanned images, characters, words (including handwritten, hand printed, or machine printed) in their original skewed condition with other related conditions and artifacts. For example, this knowledge base may be populated with 15 million or more unique patterns of a lower case machine print letter 'a' and may have 25 million or more unique patterns of an upper case machine print letter 'R'. The recognition engine 30 uses this massive knowledge base of stored patterns to compare or match against the letters and words that reside on an image file or document image being recognized.

The system preferably is able to handle a large number of pattern matches simultaneously or near-simultaneously. For example, with sufficient hardware resources, the system may be able to perform 10 million or more unique pattern matching operations (i.e. complete pattern matches) per second, whether the operations are distributed parallel, serial, or some combination thereof. The system architecture, hardware and software, may be upgraded to increase the number of matches per second.

Individual character or word dot patterns may include surrounding background pixels/dots or have pointers back to the original digital image file. These patterns along with the original image files may be stored in the knowledge base with the correct character code values and constitute known entities. These known entities or known character code patterns are compared with unknown patterns being read or cut by the software from image files. The dot for dot (pixel for pixel) overlay or pattern overlay tolerances are tight enough that the known and unknown patterns typically either qualify as a high probability confirmation/confidence match or do not match the character, word, or words whether machine printed, hand printed or handwritten.

It may not matter what the DPI (dots per inch) resolution of the original image is for the dot pattern data. The entire pattern including the dots along with the image file from which the pattern was cut may be stored in the knowledge base in its entirety. If the dot pattern is found to be a known character or word, the dots that make up that pattern may be stored in the knowledge base along with any associated character code or codes. Not only does this provide for a massive knowledge base for machine print and handwriting patterns, but the systems and methods may also be used to create computer based massive knowledge base recognition systems for vision pattern recognition, hearing or sound pattern recognition, speech pattern recognition, forecasting pattern recognition for stock investment analysis, business trend pattern recognition, sports predictions, robotic functionalities, or other matters, where the knowledge base data store may be utilized to store patterns and image information providing for more accuracy in all of these areas.

The knowledge base 30 may be used to verify whether the pattern based index 34 or the neural net index or neural net recognition engine 32 is accurate. The neural net index or neural net recognition engine 32 may be made up of one or many nodes. The pattern based index 34 and the contextual processor 36 may be one or more nodes. The knowledge base 30 may be used as a back-end verification engine for other OCR engines in the industry.

The knowledge base recognition and processing engine 30 may utilize massively parallel amounts of RAM or flash memory, solid state disk memory (i.e. storage in a chip instead of on a platter), or other memory that may emerge in the future, parallel processing distributed and non-distributed. Whatever randomly accessible memory technologies that exist according to the technology of the day may be utilized to its optimal performance and capacities. The object here is to provide a large memory cache to cache as much of the knowledge base as is feasible.

Neural Nets, as known in the art, may be used for indexing into the knowledge base with feedback from the knowledge base on how the index performed so that the neural net can learn how to index better the next time. The knowledge base verifies results generated by the neural net index or provides feedback to the neural net index or in other words, the neural net index learns from the knowledge base feedback.

A pattern-based index 34 that utilizes evolving dot pattern shapes to differentiate between characters and words may be implemented in a distributed RAM cache where it indexes into a knowledge base 30.

Each pixel/dot of a pattern may be defined as a node within a multi-dimensional linked list. Typically, there is one node defined for each pixel/dot, so if there are 500 dots to a pattern then there are 500 nodes in the multidimensional linked list. Each node has its own (X,Y,Z) coordinate representing its coordinate location within the pattern. The Z coordinate may or may not be used in certain circumstances. All defined pixel/dot nodes are processed as a multi-dimensional linked list into the knowledge base along with their dot pattern and can be subsequently modified. Each node has multiple links to other nodes—some links are to immediate neighbors and others are not. Each node has multiple attributes such as the number of contiguous nodes in a group, for example 300 dots grouped together. In the same Z coordinate level, a node can have up to 8 surrounding nodes just as a dot is surrounded by 8 other dots. When ink lines overlap in handwriting, the neighbor nodes exist above and below in different levels having different Z coordinate values. Each ink line overlap may increment the Z-level coordinate value by 1.

There are degrees of freedom associated with each link, to add nodes in between links or to subtract nodes in between links. This provides elastic qualities to the pattern where it can stretch, morph, distort, etc., yet keep its correct Unicode identification and definition. Each pixel node or dot node has embedded intelligence items or variable fields containing attributes or metadata about that node and attributes or metadata in relation to other nodes within the entire character or word pattern or entity.

With handwriting, even the same author writes no two words or letters alike just as no two snowflakes are alike. With this in mind, nodes with elasticity can be implemented within knowledge base character or word patterns in at least, but not limited to, two ways: (1) When matching an unknown character or word to knowledge base entities, if an exact enough match cannot be found, then an elasticity process may be used to stretch, shrink, or morph the known entity within specified degrees of freedom to create a match to the unknown character. (2) When adding a new entry into the knowledge base an elasticity process may be invoked to modify its shape to create different variations of the same pattern—each of which can be stored as a separate entity in the knowledge base. Just as flash cards can show iterations of still images as if they are moving, so can the progressive iterations of saved knowledge base entities show elastic stretching or shrinking movements of a character or word. This method uses more storage.

Dot patterns are stored in the knowledge base along with many attributes and metadata that may add human knowledge to each pattern or to each dot of a pattern. For example, some of these attributes may be: word or sentence context, dictionary spelling attributes, grammar attributes, font style attributes, same author style attributes, handwriting style or hand printing style attributes, and other attributes such as but not limited to historical context, country, gender, language, dialect, ethnicity, encyclopedic, lexicon or lexical, demographic, and geographic. It may also be possible for Google and Wikipedia knowledge or other knowledge bases to provide knowledge attributes to the pattern entities. Additionally, user input steps may also become attributes to a specific pattern such as the user input steps required for the user to manually cut a character pattern or handwritten word pattern from the image.

The method employs a graphical user interface that allows the user to manually provide inputs that the system learns. Manual inputs are another method of training the knowledge base, and this option may be provided to allow manual input training to the knowledge base. This user interface with its associated icons, menu items and user selection options provide a user input environment that allows the system to learn each step of the cutting process. The cutting process is the process of lifting dot patterns, character dot patterns, word dot patterns or other patterns off the image and storing them into the knowledge base with, for example, Unicode or other character code values, size, and other attributes. This learning mode user interface is disclosed more fully below.

Character cutting or word cutting may employ a sliding aperture or ink flow algorithms or other algorithms as known in the art or hereafter developed, plus progressive feedback from the knowledge base to help guide the cutting process. As the cutting process identifies patterns of dots it submits them to the knowledge base. The knowledge base searches for pattern matches and may feed them back to the cutting process along with their Unicode or other code values and other attributes. The cutting process then utilizes these fed-back patterns as a guide or template to continue cutting characters or words off the image file.

As more dots are identified and cut, they are in turn submitted to the knowledge base to use to find more pattern matches and feed the new patterns back to the cutting process. The cutting process, then, progressively cuts character and word patterns from the image file through progressive pattern feedback from the knowledge base. Dot pattern progression is just one form of knowledge base feedback.

Other forms of progressive feedback use human knowledge to discern characters and words. Humans use word spelling, context, grammatical word flow or sentence context, as well as human experience context to read and decipher individual words and their characters. The knowledge base can provide these same kinds of feedback. For example, when a human reads a word they may find a character that is not discernable by itself. But, as they read the entire word within its grammar and sentence context and also human experience context, then it becomes apparent that the word has a higher probability of being word "A" rather than word "B" because of the grammatical context.

As an example of the method in use, first the director node 24 opens a working copy of an image file and verifies it to be in grayscale, color, or black and white. If in color, the engine uses existing algorithms as known in the art to convert the file to grayscale. Image files are stored in rectangular X,Y coordinate systems and may need to be converted over to the Cartesian coordinate system for processing, rotating, translating and scaling purposes where the (0,0) origin may be moved or relocated any number of times throughout the image or dot pattern. Also, the image or dot pattern may be translated in any direction multiple times to facilitate the overlaying of two dot patterns or images on top of one another to compare them and see how well they match.

In this disclosure, whenever rotating an image or dot pattern is referenced, it may be necessary to add white or background dots around the periphery of the image or pattern, similar to adding a picture frame, to avoid peripheral data loss during rotation. This applies to an entire image or to any smaller sized portion of an image such as a character pixel/dot pattern or handwritten word pixel/dot pattern, etc.—thus insuring that during rotation the boundaries are large enough to allow rotation of all original pixel/dots without loosing any. Another implementation of avoiding image data loss may be to use a large size coordinate grid of points with which to rotate dot patterns and images.

The actual rotation of an image or dot pattern may be done using existing algorithms as known in the art, or, may be done using the rotation methods disclosed below. Also, translating an image may be done using existing algorithms as known in the art. Scaling of images or dot patterns may be done using existing algorithms as known in the art or may be done using the methods disclosed below.

Thresholding is used to distinguish the ink from the background in an image. Thresholding is done using thresholding algorithms as known in the art or along with thresholding steps described herein or both. That is, the grayscale lightest and darkest dots of the image file are determined by examining each dot to determine its value where 8-bit grayscale value of 255 is white and 0 is black. The dots per inch (dpi) resolution of the image is also determined.

Figure 1:
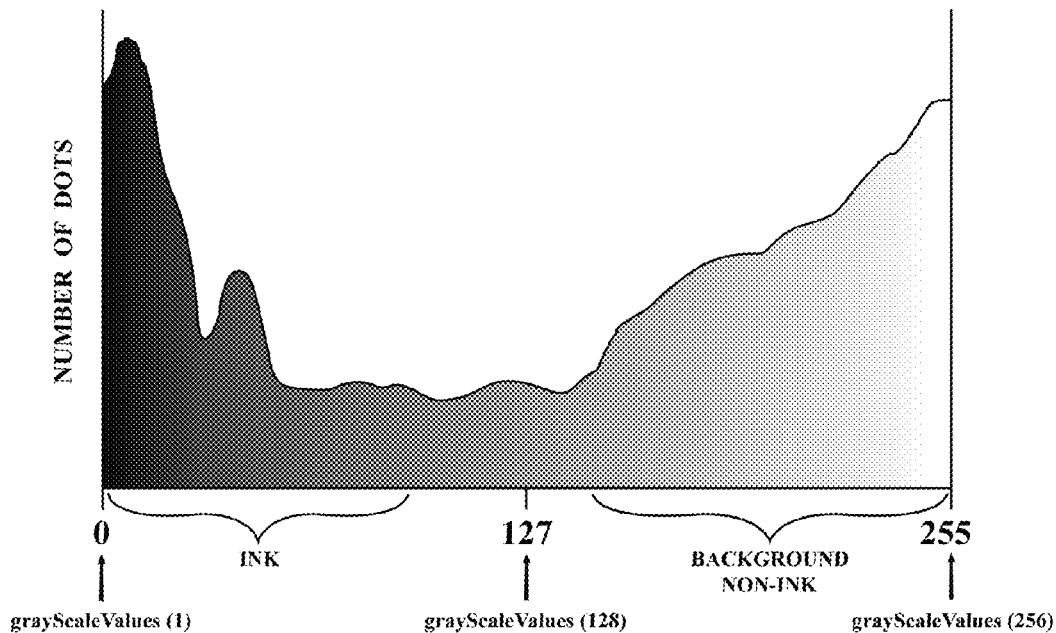
FIG. 1 is a histogram graph of an array of grayscale values depicting one thresholding solution in determining ink and background dot values.

The director node 24 sets up an array of variable grayscale values (0-255) to receive a running integer total of each grayscale dot in the image. An example of this array is demonstrated in FIG. 1, which shows a plot of all grayscale dots of a sample image onto a horizontal histogram and identifies areas where ink is most likely by the highest concentration (or the opposite, if dealing with negative images) of darkest dots and where background is most likely by the highest concentration of lightest dots.

The director node 24 takes small pieces or areas of the image and creates a histogram for each piece or area, in this embodiment, starting with two inch square pieces or areas. The resulting histogram for each piece or area is stored with results with its associated histogram. An alternative embodiment may use circular or elliptical shapes and increment their movements in an overlapping manner across the page where the increments can vary in length.

Next, choosing smaller sized pieces or areas each time, the process is repeated, typically across the entire image, with (for example) 1.5 inch squares, then 1.0 inch squares, then 0.75 inch square, then 0.5 inch squares, then 0.375 inch squares, then 0.25 inch squares, and smaller if needed or larger if needed—creating each histogram as described.

Another embodiment uses a sliding aperture that moves horizontally across the image incrementally using varied increment lengths and creates histograms and saving histogram results as described. The horizontal increments can be of varying lengths for each pass. The aperture makes each pass horizontally across the page and when finished it increments its center point vertically downward and makes another horizontal pass across the page. The vertical increments can also vary in length. The aperture typically traverses the entire image before horizontal or vertical increment lengths are changed or adjusted. The aperture can also be resized in small or large increments to accommodate the thresholding process and identification of characters, words, and fields on the image.

Another embodiment uses a sliding aperture that traverses the entire image, where, for each aperture traversement of the image, the aperture direction can vary, the aperture incremental movement distances can vary, and the aperture shape can vary. Another embodiment uses a sliding aperture that traverses a portion of the image, where, for each aperture traversement of the image, the aperture direction can vary, the aperture incremental movement distances can vary, and the aperture shape can vary.

With the stored results of the many histograms generated, the engine uses the highs and lows of the grayscale dots to approximately distinguish, differentiate or determine the ink from the background page. The engine turns the background completely white by modifying the background grayscale dot definitions accordingly. It may be advantageous to change the background to a lighter grayscale shade that is almost white. In some cases one inch and smaller pieces or areas may be better for generating histograms to locally determine ink from background. In other cases a mix of large and small histograms may be needed to properly threshold the entire image file. The thresholded image may be stored as a new image file name. An example of this result is depicted in FIG. 2.

Figure 2:
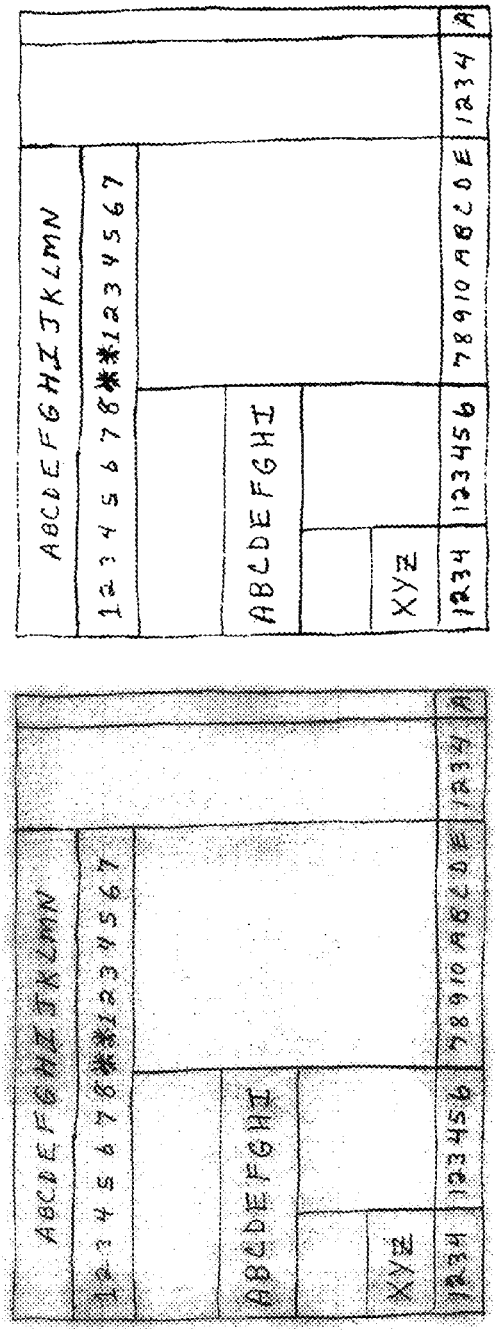
FIG. 2 is an exemplary image showing the effects of thresholding according to one embodiment.

Ink flow algorithms as known in the art may be used to identify text and lines in the thresholded image of FIG. 2. An alternate method to identify text and lines is by manual user input where the user clicks the mouse pointer on the endpoints of the lines to locate form lines and fields. An icon called "identify lines" and "locate text" may be used in the Graphical User Interface (GUI) at the client 12 to initiate the user's mouse clicks to locate lines and text. Two approaches may be used here, identifying endpoints of a line or identifying endpoints of text, or identifying diagonal corners of a box or identifying vertices of a polygon that surrounds text or which identifies a form field box or rectangular box as described below.

Figure 3:
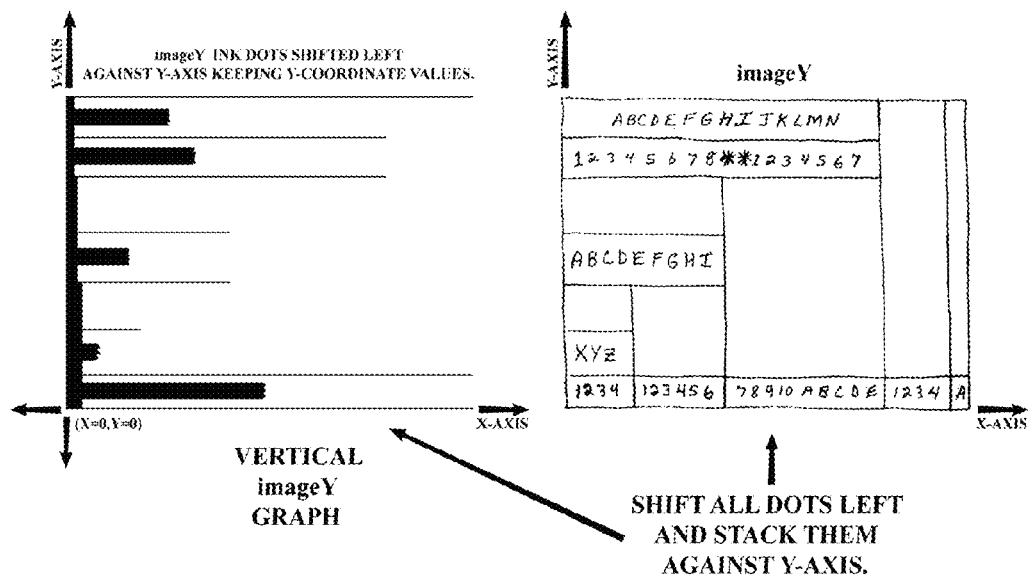
FIG. 3 is an exemplary image and a corresponding vertical image histogram graph to identify horizontal lines and text locations.
Figure 4:
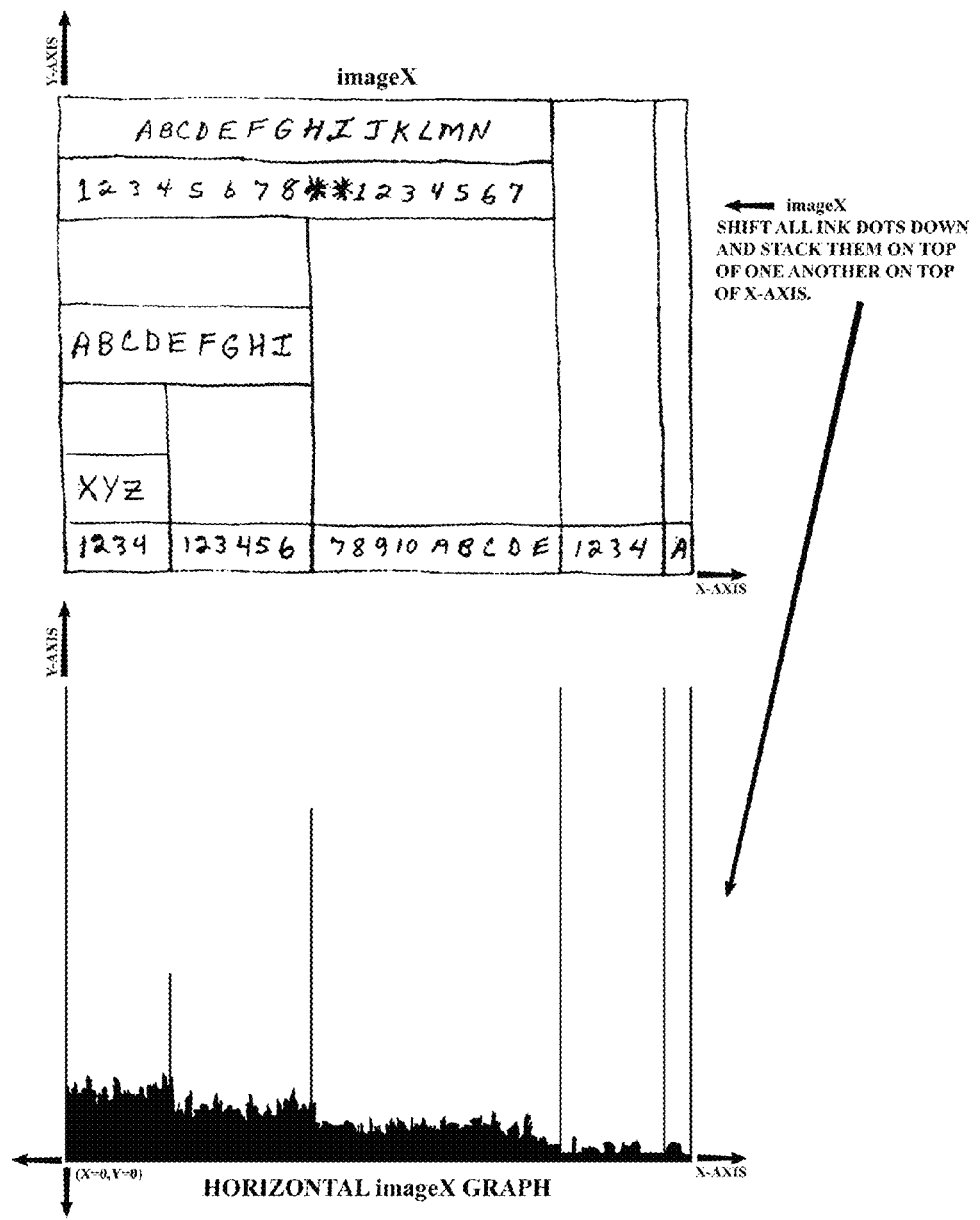
FIG. 4 is an exemplary image and a corresponding horizontal image histogram graph to identify vertical lines and text locations.

Assuming the thresholded image in FIG. 2 has been de-skewed, another method to identify text and lines is to project the image against the X and Y axes as shown in FIG. 3 and FIG. 4. That is, the engine makes two copies of the image file and names them imageX and imageY. Assume the left edge of each image is the Y axis where X=0 and assume the bottom edge of each image is the X axis where Y=0. In other words, the image itself is located in the upper right quadrant of the Cartesian coordinate system with the image's lower left corner at X=0 and Y=0. A graph will be created from imageX and another graph created from imageY. These two graphs will help determine the location of lines and text on the image.

Starting with imageY, the director node 24 shifts all ink dots or non-background dots to the left by changing their X coordinates so that they stack up horizontally against the Y axis with each dot's Y coordinate remaining unchanged. For example, starting at the leftmost side of the image, change the X coordinates of each ink dot such that all ink dots are contiguous as in the Vertical imageY. The result may be a graph as depicted in FIG. 3. Then take imageX and shift all ink dots or non-background dots to the bottom by changing their Y coordinates so that they stack up vertically on top of the X axis with each dot's X coordinate remaining unchanged. For example, starting at the bottom side of the image, change the Y coordinates of each ink dot such that all ink dots are contiguous, resulting in a graph such as that depicted in FIG. 4.

Using both vertical imageY graph and horizontal imageX graphs depicted in FIG. 3 and FIG. 4, it is apparent (assuming the image is not skewed) where the lines of text are located along the Y-axis and X-axis. This is also apparent where the image's form lines or fields are located on histograms A & B. Once the text and lines are located along both the X and Y axes in FIG. 3 and FIG. 4, then more detailed thresholding can begin with lines and text.

Using the Vertical ImageY Graph depicted in FIG. 3, the director node 24 identifies the thin horizontal lines, records Y-axis coordinate value(s) for each line, and then determines and records the length of each horizontal line. Throughout this process, the director node 24 may use progressive feedback from the engine 30 to discover horizontal lines. This information is used to discover the horizontal lines on the actual document image file by matching the Y-axis location for each line and its length to those dots on the image with the same Y-axis locations and length. The beginning and ending of the lines is not known along the X-axis but its Y coordinate and horizontal length is known.

Using Horizontal ImageX Graph depicted in FIG. 4, the director node 24 identifies the thin vertical lines, records X-axis coordinate value(s) for each line, and then determines and records the length of each vertical line. Throughout this process, the director node 24 may use progressive feedback from the engine 30 to discover vertical lines. This information is used to discover the vertical lines on the actual document image file by matching the X-axis location for each line and its length to those dots on the image that have the same X-axis locations and length. It is advantageous to take note of the line thickness or average line thickness as well as its median, high, and low thicknesses to gauge how many dots to traverse on the document's image file during this discovery process. Once the lines are found on the image, then the lines are used to perform further thresholding if needed as shown in FIG. 5.

Figure 5:
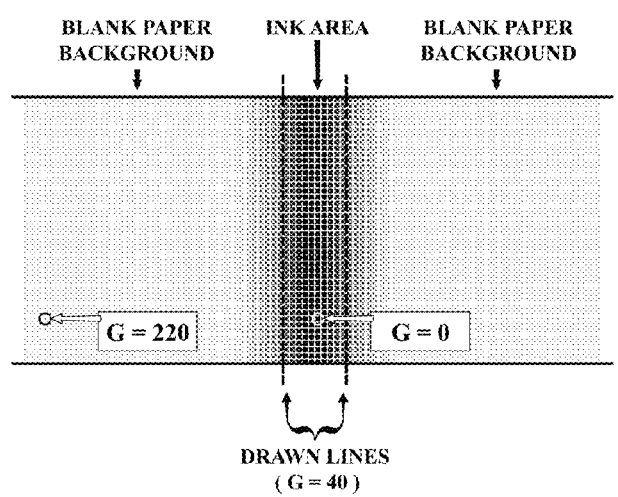
FIG. 5 is an exemplary grayscale image depicting progressive thresholding of a portion of a vertical line.

As an example, with 8-bit grayscale values where G=black=0 and G=white=255, FIG. 5 depicts light grayscale dots at G=220 for the blank paper background and G=0 for the very darkest or black dots where an ink line is likely to reside. The drawn lines at the G=40 grayscale dot values show where the threshold exists between what is ink and what is blank paper background where there is no ink. The threshold value G=40 can be a value other than 40 through progressive feedback pattern matching with the knowledge base using the varying histograms described.

Arriving at G=40 or G=44 or G=50 or G=60 is a thresholding iterative process through iterative progressive feedback pattern matching from the knowledge base 30. It is not an exact one-time operation but iterative. Thresholding has not a single solution but many results or variations depending upon the character or word or words being thresholded.

Often it is good to begin progressive thresholding from the darkest grayscale dots and work towards the lightest local background grayscale dots. Characters and words are stored in the knowledge base with their surrounding background areas or have pointers back to the original location within the original image file. It can be a massively parallel iterative process of progressive feedback from the knowledge base 30 to obtain the best thresholded G values, for example, as shown in FIG. 5 where the center of the ink area is G=0 and the drawn lines are iteratively moved outward from the G=0 center until a progressive match is found from the knowledge base, which in FIG. 5 is G=40. Once initial threshold values are found on an image, these values can then be tried on other areas of the image file provided the histograms from locally adaptive thresholding are consistent with one another. Using the same methodology or concept can be used to identify the vertical lines on the original image as well.

The more densely populated dark dot areas may have a higher probability of being text as seen in FIG. 3 and FIG. 4 Vertical ImageY Graph and Horizontal ImageX Graph. Taking imageY first, locate the thick horizontal bars in the Vertical ImageY Graph—these thick horizontal bars are most likely text areas—and see how far they run horizontally compared to the other plotted points. If they are markedly or relatively longer, then text is more likely stacked against the Y-axis. Use the Y coordinates of these bars to locate possible text on the actual image. Also, using the X coordinates from FIG. 5 Horizontal ImageX Graph, one can also determine possible distribution of text characters along the X-axis of text.

An alternate method to threshold grayscale images is to project the image into 3D by assigning a Z-axis value to the different grayscale dot values such that the darkest dots are in the foreground and the lightest dots are projected into the background. This will result in a three-dimensional image where the characters, words, lines, etc., protrude out from the background page. When the background page has varied grayscale values the document page or background will not be flat but warped. If the background is warped, then characters, words or lines can be cut by slicing them off at varied offset distances from the background. The slices can be taken iteratively starting just above the background and then subsequent slices can be done successively at greater distances away from the background until reaching the darkest dots (or lightest if dealing with a negative image) of each character, word, or line being cut. Each sliced item (character, word, line, etc.) can be progressively compared to the knowledge base 30 for possible matches.

According to one embodiment of the present method, all full images, part images or dot patterns such as characters, words, graphics, lines, etc., are stored in the knowledge base as knowledge base entities in their original skewed state as they were originally digitized, scanned, or digitally photographed. In other words, by not de-skewing or by not rotating an image or dot pattern prior to storing it in the knowledge base, the dot placements and visual data integrity are preserved and image distortion is avoided. Knowledge base entities stored in their original skewed state may also have stored along with them a rotated or de-skewed version or rotated or de-skewed versions of that entity.

The skew angle or angle of skew may be stored as an attribute to each knowledge base pattern or image entity—whether the entity is an entire image or a dot pattern of a character, word, characters, words, graphic, graphics, line, lines, entire page, or other entity. Each pattern type or image type will have its own skew attribute such as, but not limited to, the following skew attribute variables or skew data fields: imageSkew, characterSkew, wordSkew, multiCharacterSkew, multiWordSkew, graphicSkew, lineSkew, multiLineSkew, pageSkew, and so on. There may be more skew variables of dot patterns or image entities stored in the knowledge base as needed which are not specifically mentioned here. Two methods of deriving the skew angle or angle of skew for an entire image are depicted in FIGS. 6 and 7.

There are times when the rotation of known and unknown images or dot patterns becomes necessary when finding the best match between them. With sufficient computing abilities, storage capacities, parallel processing abilities, etc., it is possible to do either a nearest neighbor rotation or a virtual rotation as described below. The virtual rotation would allow a rotation accuracy and preservation of the original image's visual integrity without image distortion. Once the rotation angle is determined, it may either be passed to an image rotator software routine, such as a Java Advanced Imaging routine, or other programming language imaging routine as known in the art to do the actual rotation or use a nearest neighbor rotation or a virtual rotation as described below.

Figure 6:
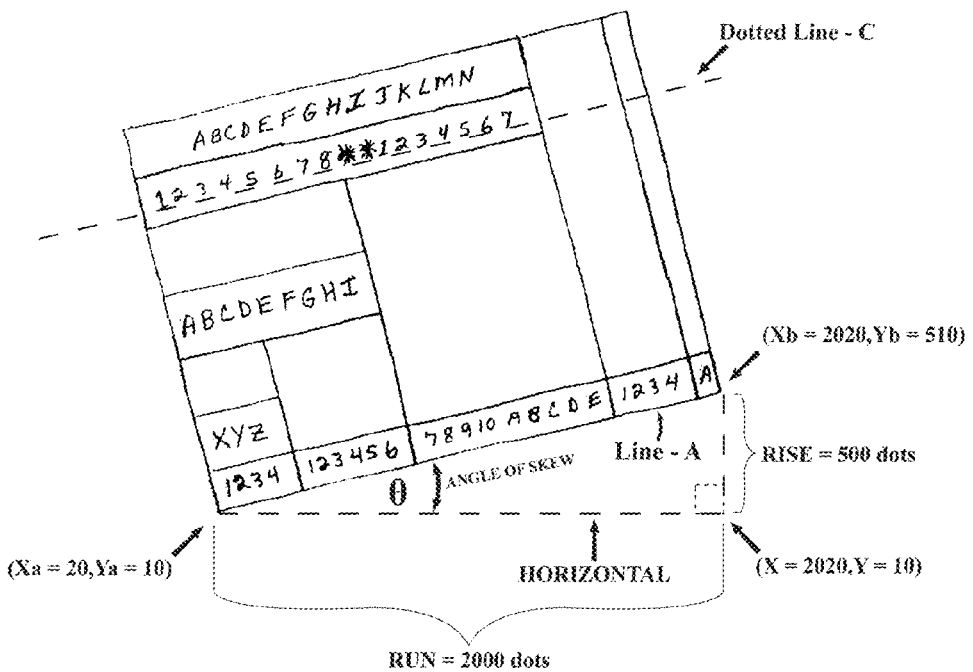
FIG. 6 depicts an exemplary image clockwise de-skew rotation.
Figure 7:
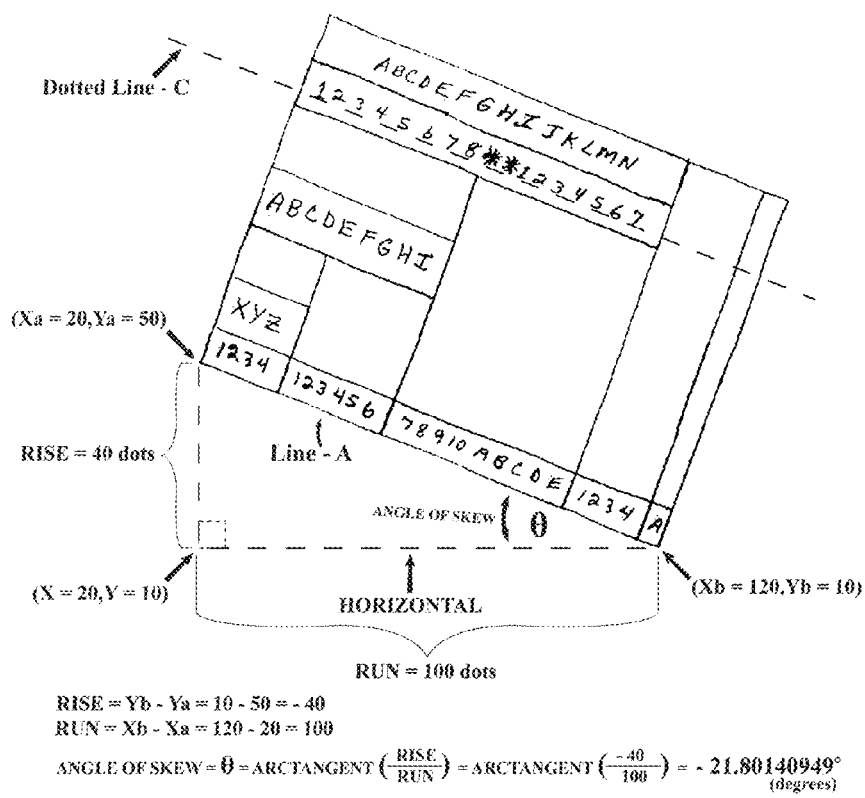
FIG. 7 depicts an exemplary image counter clockwise de-skew rotation.

FIG. 6 shows XY coordinates of the endpoints or end dots of Line-A of the image file. One method of finding the XY endpoint coordinates of Line-A is to derive them by finding the end dot coordinates of a one dot thick line of symmetry that runs lengthwise through Line-A. If no actual lines exist in the image or dot pattern then Dotted-Line-C may be drawn (either by manual user input by the user clicking the mouse on the location of the two endpoints of Dotted Line-C or the system can automatically determine the endpoints of Dotted Line-C without manual user input) as a temporary line of one dot thickness adjacent to the baseline of a line of text as shown in FIG. 6. Line-A or Dotted-Line-C can be good candidates for the skew line but are not necessarily the only choices. FIG. 6 shows the endpoints of Line-A with coordinates Xa=20 and Ya=10 for the left end and coordinates Xb=2020 and Yb=510 for the right end. Using trigonometry, the angle of skew is derived by taking the arctangent of Line-A's rise over run, giving the result of +14.03624347 degrees in the example depicted.

For accuracy, it is often preferred to use as many significant digits and corresponding decimal places as possible in calculating arctangents to obtain the most reliable and highest precision angles of skew. The rotation will be either clockwise or counter-clockwise depending upon whether the slope is positive or negative giving a corresponding arctangent result that is positive or negative. The example depicted in FIG. 6 shows a slope rise as a positive number giving an arctangent result of a positive or clockwise rotation of +14.03624347 degrees.

If the image were skewed the other direction as depicted in FIG. 7, then the Line-A rise would be negative 40 (−40) giving an arctangent result of a negative or counter-clockwise angle of skew of −21.80140949 degrees. To de-skew the image in FIG. 6, it must be rotated clockwise 14.03624347 degrees about any point or dot, preferably the image's centroid, by passing the angle of skew to any number of image rotators as known in the art.

Another way of rotating an image or dot pattern is to take the angle of skew and rotate the entire image as a whole using a multi-dimensional linked list. By inputting all image dots into a multi-dimensional linked list with each dot being linked to its neighbor dots, when one dot moves, all its neighbor dots move with it, and the entire image rotating as a single unit due to their links. This avoids the displacement of dots. A rotation such as this is virtual and requires a floating point calculation approach using as many decimal points of accuracy as possible.

Figure 8:
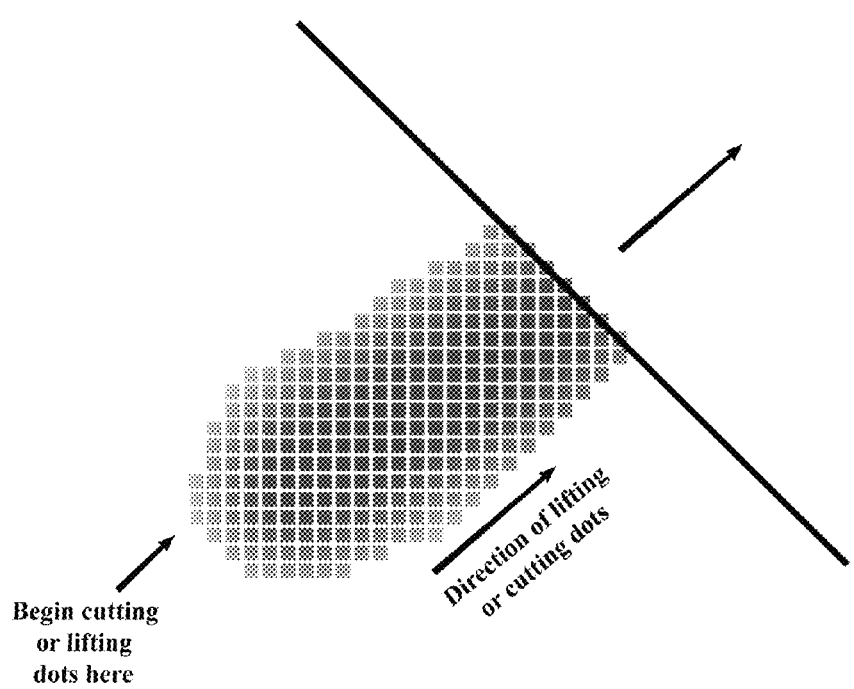
FIG. 8 depicts an exemplary dot cutting according to one embodiment.

Another process is that of character or word cutting or lifting using progressive feedback from the Knowledge base 30. Using the knowledge base 30 as a backup, the director node 24 begins at the text locations or flags/tags and begins discovering the extents of a character. Using ink flow algorithms as known in the art, the engine copies ink dots and their XY coordinates from the image or dot pattern into a buffer. Once a "sufficient" number of dots have been copied into a buffer, so as to begin to identify a discernable pattern, the director node 24 begins sending progressive match requests to the knowledge base 30 to begin the process of progressive feedback from the knowledge base 30 as to what the pattern may lead to in matching up with a particular word or character, whether it is machine print or handwritten. The word "sufficient" as used in the previous sentence can be throttled to a larger number of dots or throttled to a smaller number of dots depending upon the matching success with the knowledge base. For example, if the pattern looks as noted in FIG. 8, then it may be part of a letter "l" or "t" or part of a letter "a." So in this example it may be appropriate to read in, cut, or lift more dots in one pass.

Figure 9:
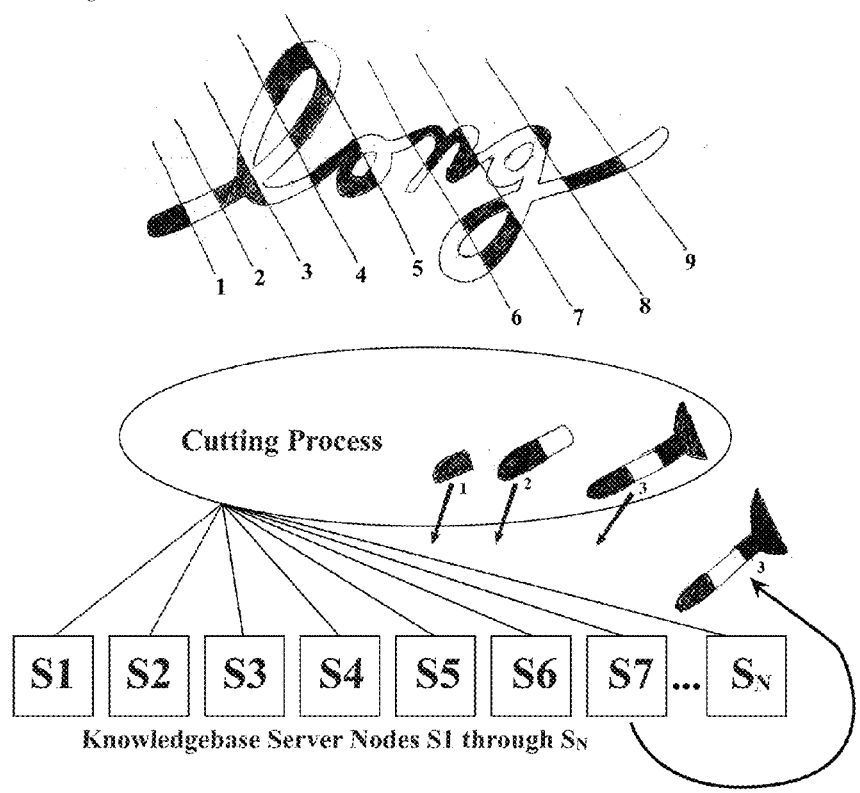
FIG. 9 depicts an exemplary progressive knowledge base feedback line cutting according to one embodiment.

As an example, the cutting process on the director node 24 may begin by taking the dots to the left of line 1 depicted in FIG. 9 and submitting the group of dots or dot pattern to the knowledge base 30 where they are multicast to each of the servers S1 through SN also shown in FIG. 9, where each server contains a unique portion of the knowledge base. In other words, the knowledge base is divided up between or distributed across the servers in FIG. 9, where S1 contains the first portion of the knowledge base and S2 contains the next portion of the knowledge base and so on until SN contains the last portion of the knowledge base and where no server contains a duplicate portion of the knowledge base except in the case of mirror nodes described below.

The dot pattern is shown in FIG. 9 to demonstrate cutoff points for progressive cutting-feedback with the knowledge base. At some point, the servers that produce no matches will return lower match values than those servers that are finding higher match values. Progressively, as matches are closer, this data is fed back to the cutting process and helps guide the cutting process which can adapt its cutting methods accordingly—by varying the orientation, shape, and spacing of lines 1 through 9 in FIG. 9 to better suit and optimize the cutting process. When matching becomes closer, the servers with the closer matches will be able to provide read-look-aheads to the cutting process to help guide the cutting process to find where the next dots to be cut are on the image file. FIG. 9 shows knowledge base server node 7 returns matches for cuts 1, 2, and 3.

Read-Look-Aheads (ReadLookAheads) may also be used by all knowledge base servers 30 to return forecasting patterns or progressively fed patterns as to what the possible patterns are to be cut next. A forecasting pattern may be progressive slices taken from a knowledge base pattern that are fed back to the cutting process. These forecast slices provide possible solutions in what image dots may need to be cut next.

The knowledge base pattern entity slices may be taken at various angles and may contain as few as one pattern dot up to the entire pattern being fed back to the cutting process. The amount of forecast pattern data sent from a single pattern in the knowledge base must be throttled so as not to feed too much forecasting pattern information to the cutting process unless the cutting process running on a sufficient quantity of director nodes 24 can handle such a massive volume of progressive feedback data from the knowledge base 30. The feedback must be formatted in such a way as to not inundate the cutting process running on the director node(s) or perhaps running on a client.

The director node(s) 24 returning percentage values to the knowledge base 30 of how close the progressive knowledge base pattern match is may be used also to guide the cutting process and may help avoid inundating the cutting process with too much progressively feed back pattern image dots or pixels from the distributed knowledge base. As patterns or portions of patterns are fed from the knowledge base 30 back to the cutting process, the cutting process may attempt to match the patterns by overlaying the known knowledge base 30 entity over the top of the unknown character or word being cut by rotating, translating, and scaling the known pattern over the top of the unknown character or word to find the best overlay match for the dot patterns being cut from the image file. If scaling is required, it will be performed with existing algorithms or Java advanced imaging routines or other programming language software library functions or routines as known in the art or by using the virtual scaling methods described below.

As the knowledge base 30 becomes more populated with different sizes and resolutions of pattern entities, scaling them may become less required. Not scaling images or pattern entities avoids having to add pixel data or image dot data that does not exist when scaling up or by removing pixel data or image dot data that does exist when scaling down. Character cutting (and matching) can also be done with an alternative implementation of morphing the character or word being cut onto knowledge base entries. The higher the percent morph or the more morphing that needs to be done works out to be a less likelihood of a match. The less morphing needed works out to be a greater likelihood of a match and a higher probability value of a match is returned. This morphing technique may be used for character or word cutting and character or word matching.

An alternative embodiment may be to do dot shifted histogram graphs, as depicted in FIG. 3 and FIG. 4, of individual characters and words and submit them to the knowledge base 30 for progressive feedback for indexing purposes. Another approach to cutting/lifting characters or words is to superimpose, morph, form, or shape knowledge base 30 characters or words over the top of those on the image and note the amount of morph, percent morph, or percent change needed to do the morph overlay completely. The director node 24 character cutting process using progressive feedback from the knowledge base 30 is illustrated in FIG. 9.

Once the character or word is cut, or while the character or word is progressively being cut, it can be fed into a neural net 32 as known in the art where the neural net 32 functions as an index into the knowledge base 30 or some portion of the knowledge base 30 and where the knowledge base 30 or knowledge base 30 portion provides the final confirmation of the recognition process in matching dot patterns and returns Unicode or other code values or the knowledge base 30 functions as a progressive feedback engine returning probable matches for patterns that are being cut. The neural net 32 may function either as an index into the knowledge base 30 or as a recognition engine 32 or both, where the knowledge base 30 provides the final confirmation in recognizing words and characters. The neural net 32 may return a set of knowledge base 30 server nodes to the director node 24, which sends search requests to each knowledge base 30 node to get the pattern matched. Other indexing methods may also be used to index into the knowledge base 30.

If the knowledge base 30 nodes find no match through indexing, then the neural net 32 index or other index may be in error and the director node 24 bypasses the optional indexes 32 and 34, altogether and may perform a non-indexed flat database exhaustive search through the entire knowledge base 30. If a full knowledge base 30 search finds no match then the pattern is queued for manual user input, which interface may be launched automatically by the software or invoked manually by the user, pulling the image from the image store nodes 22, which obtains user inputs by keyboard and mouse to guide the user to manually cut the dot pattern of the character or word and guides the user to manually input or key-in the dot pattern's correct Unicode or other code value. As the user selects more dots the pattern changes and the knowledge base 30 can provide updated match suggestions which the user may or may not agree with. When the final dot pattern and its correct Unicode or other code value(s) are determined by the user, then all this data and other user input related data may then be committed to the knowledge base 30 as a new entity or entities.

One method to determine matches is for the matching process within the knowledge base 30 to iteratively overlay, rotate, translate, and scale dot patterns relative to any dot position to find the best fit while iteratively determining if the match lies within set tolerances. This method chooses a common point about which to overlay, rotate, translate and scale two dot patterns at a time, known patterns and unknown patterns, such as a center point, a centroid or some other point that exists such as, but not limited to, a corner point such as the bottom left, bottom right, top left, top right, or some other point. One method with regard to tolerances is to produce a match score and measure it against a close to high probability confirmation or confidence threshold to determine a match or no-match result; otherwise a "no match found" code is returned by the knowledge base 30 to the director node 24, the neural net index 32, or other index or process.

Final matching may be accomplished using dot for dot comparisons to determine whether the ink dots overlap in their positions and if their grayscale values also match. The match is typically within the knowledge base 30 matching tolerance limits to insure a high probability confirmed match where the user can trust the resulting Unicode or other code value(s) assigned to the character or characters or word whether handwritten, hand printed, machine printed or some other mode or kind of text. The matching process will match unknown dot patterns with known dot patterns by overlaying the known knowledge base 30 dot pattern entity on top of the unknown character or word or vice versa and by rotating, translating, and scaling the known pattern over the top of the unknown character or word to find the best overlay match for the dot patterns that were cut from the image file.

One method of comparing dot patterns being overlaid is to XOR the overlaid dots where if they are not overlapping or do not match so that the result is a 1 or true. When dealing strictly in black and white images, where the image has been most likely thresholded into black ink and a white background, the dot comparison is between black=0 and white=1 dot values. With grayscale character or word dot patterns, where the dot values are in 8-bit grayscale or 16 bit grayscale, where the darkest shade of black=0 for both 8-bit and 16-bit grayscales, and the lightest shade or white=255 for 8-bit grayscale and white=65535 for 16 bit grayscale, one method is to first change the grayscale dots into black=0 dots and white=1 dots by using thresholding algorithms as known in the art and/or by using the thresholding methods described herein. Another embodiment is to compare the grayscale values of dots between two dot patterns to see if their grayscale values as well as their dot positions match.

When matching grayscale dot patterns, one pattern may have 8-bit grayscale dot values ranging from 0 to 180 and the other pattern being matched has of 8-bit grayscale dot values that range from 70 to 245. Since their grayscale ranges are dissimilar, the problem of how to compare the dot values arises. The two patterns may overlay well but their grayscale values have different ranges.

One method to deal with this is that the pattern's darker range of 0-180 must be mapped over and translated into the other pattern's lighter range of 70-245, so that 0 is equated to 70 and 180 is equated to 245 and so on until all the inside numbers are equated to one another in a similar manner. Another method is to populate the knowledge base with graduating grayscale ranges from dark to light for each dot pattern entity stored therein, resulting in 20 to 100 duplicates of each entity where each duplicate is a different grayscale brightness. Another method is to modify one dot pattern's grayscale range from a dark range to a light range by iterations during the matching process. By so doing, either the known dot pattern entity or the unknown dot pattern entity's grayscale range is changed to facilitate matching the grayscale dot values as well as their relative coordinate positions. The pattern entities can be thresholded at different levels and then corresponding histograms can be created for each of these levels.

Another matching method is to morph the known and unknown dot patterns together. It does not matter which one is morphed over the top of the other. The morphing will be done by overlaying one pattern on top of the second pattern, and in the case of mismatches or where the dots do not overlay one another, relocating the dots of one pattern to overlay the dots of the second pattern. One method is the percentage of moved dots versus the total number of dots of the character or word pattern being morphed equals the percent morph.

Another method for matching of characters or words in the knowledge base 30 is using multi-dimensional linked lists to create elasticity qualities in the knowledge base 30 pattern entities of characters or words and saving them as new but related entities in the knowledge base 30. This can be thought of as a molecular approach where each dot or pixel in a character or word pattern becomes an individual node in a multi-dimensional linked list (as opposed to a two-dimensional linked list or binary tree) where each dot/node or pixel/node has a link to its neighboring dot/pixel node. Elasticity qualities allow a knowledge base character or word to flex, stretch, shrink, elongate, shorten, thicken, thin-out, pivot and otherwise make a character or word become alive with elastic capabilities with specific degrees of freedom of movement assigned to each and every link in every direction—yet even though all this flexing and shrinking is going on, the original definition of the character or word remains intact.

Each node has a variable called myXcoordinate and myYcoordinate and myZcoordinate, which correspond to the X, Y, and Z coordinates of that particular node. Every node knows the coordinates of its 8 neighboring nodes as well using variables within itself that contain these coordinates. When a node is added, the surrounding nodes will adjust outward to make room. This will cause a re-calculation of neighboring nodes and their coordinates. When a node is subtracted, then surrounding nodes will adjust inward to fill the hole left by the deleted node.

The degrees of freedom of movement in each direction affect which nodes move outward when adding a node and which nodes move inward when deleting a node. The degrees of freedom of movement also are contained in variables within a node where there is a variable that exists for each of the 8 directions surrounding the node. There is also a variable that contains the current stretch or shrink direction, which then affects the direction of expansion or contraction the surrounding nodes will move and whether or not they move at all.

There may also be a variable that contains the amount of stretch and shrink in number of nodes that is executed. These nodes and their neighbor node coordinate variables should agree and a process invoked that resolves their coordinates and adjusts their movements accordingly. Movements may be considered adding, deleting, and/or moving nodes. The degrees of freedom of movement determine how elastic the character or word is.

Figure 10:
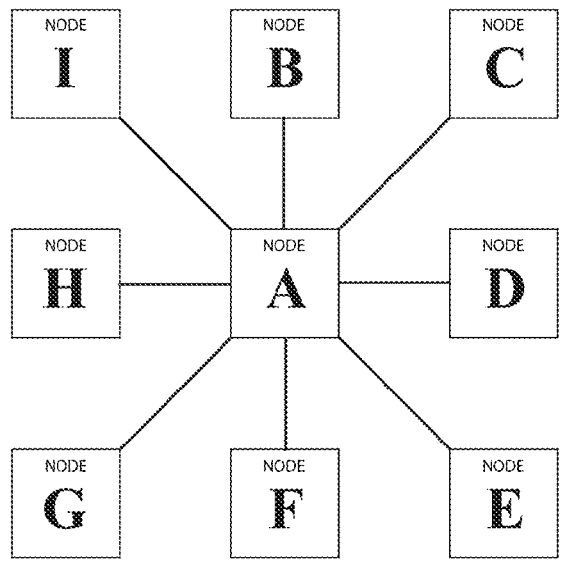
FIG. 10 depicts a sample of a multi-dimensional linked list showing the links between pixel-nodes or dot-nodes according to one embodiment.

The multi-dimensional linked list has a node assigned to each dot of the pattern—whether it is a character or word and whether it is handwritten or hand printed or machine printed. Each node of this multi-dimensional linked list will have pointers or links to each neighboring node as shown in FIG. 10 where ink dot node-A has up to eight links on its own Z coordinate level which is one link to each of its neighboring ink dot nodes B through I. Node-B can also have up to eight neighboring ink dot nodes within the same Z coordinate level and so on throughout the entire image, or dot pattern which can consist of hundreds, thousands, millions, billions or more dots—the number of ink dot nodes can theoretically be as high as the computing hardware can support.

There may be static or dynamic degrees of freedom values for each link as to how many additional nodes can be inserted in between each link. For example, referring to FIGS. 10 and 11, the link between node-A and node-E or link A-E can have node-J inserted in between. When stretching occurs, it is important to note here that it can change the Unicode definition of the dot pattern being stretched—hence the desire to use contextual knowledge base feedback or other feedback during the character cutting process as previously described. Thus, a stretching has occurred in the link A-E direction or in the south-east direction as shown in FIG. 11.

Figure 11:
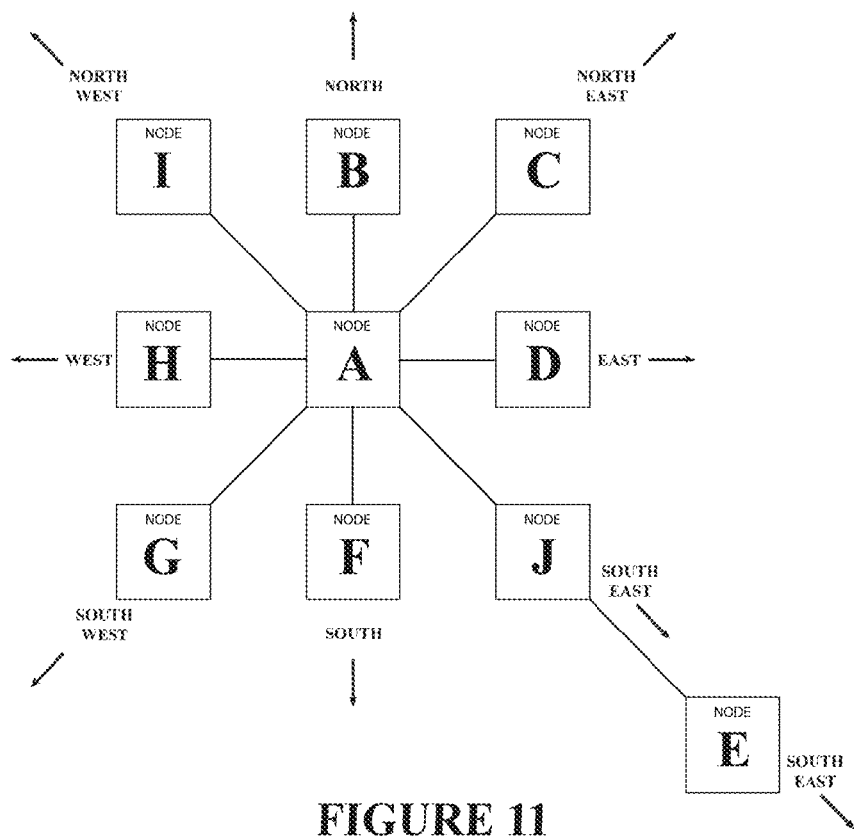
FIG. 11 depicts a sample of an elastic stretch in the south east direction according to one embodiment.

FIG. 11 depicts a "one-degree of freedom" on link A-E allowing a single node-J to be inserted in between. Hence a stretch has occurred with node-J taking the XY coordinate value that node-E once had and a new XY coordinate value given for node-E. A "two-degree of freedom" link would allow up to two additional dot nodes to be added onto that link and so on. The same can be said for shrinking, where node-J can be taken away or deleted. Hence a shrinking in the link A-J-E direction has occurred where node-J is removed and link A-E now have direct neighbor status as shown in FIG. 10. Shrinking uses negative degrees of freedom in which nodes can be deleted on particular link directions. Such degrees of freedom, positive and negative, allow flexing, stretching and shrinking of words and characters to facilitate matches with the knowledge base entities.

Not only may nodes be direct neighbors of one another in the same Z level as shown in FIG. 10 and FIG. 11, but nodes may also exist in different Z levels or have different Z-axis coordinate values. This especially applies to handwriting. For example, referring to FIG. 12, when an ink line overlaps onto itself as in the handwritten lower case letter "e," the result is overlapping ink dot nodes with different Z coordinate values where the handwritten ink line of the lower case letter "e" overlaps onto itself. The centerline direction arrows show the hand stroke of the curved line starting at the bottom left and then going up in a counterclockwise direction and back down crossing over the first line. The non-overlapping ink dots become a linked list of nodes as in FIG. 11. The overlapping ink dots in FIG. 12 become a linked list of nodes that are linked not only to their same Z coordinate level nearest neighbors as in FIG. 11 but also linked to their overlapped neighbors on different Z coordinate levels as in FIG. 12.

These overlap nodes are defined as "overlap" nodes in an attribute field within their code structures and may be defined more descriptively with even more attributes to facilitate elastic and other functionalities. With overlap nodes, their degrees of freedom of movement must be such that the overlap is maintained. Notice also the ink flow direction arrows through the center line nodes in FIG. 12, where the ink flow starts at the lower left of FIG. 12 and sweeps upward to the right and over the top and downward to the left and then downward to the right and then across to the lower right end of FIG. 12. In English handwriting, ink flow frequently starts from the left and then creates loops, etc., to the right and finally ends on the right.

Figure 12:
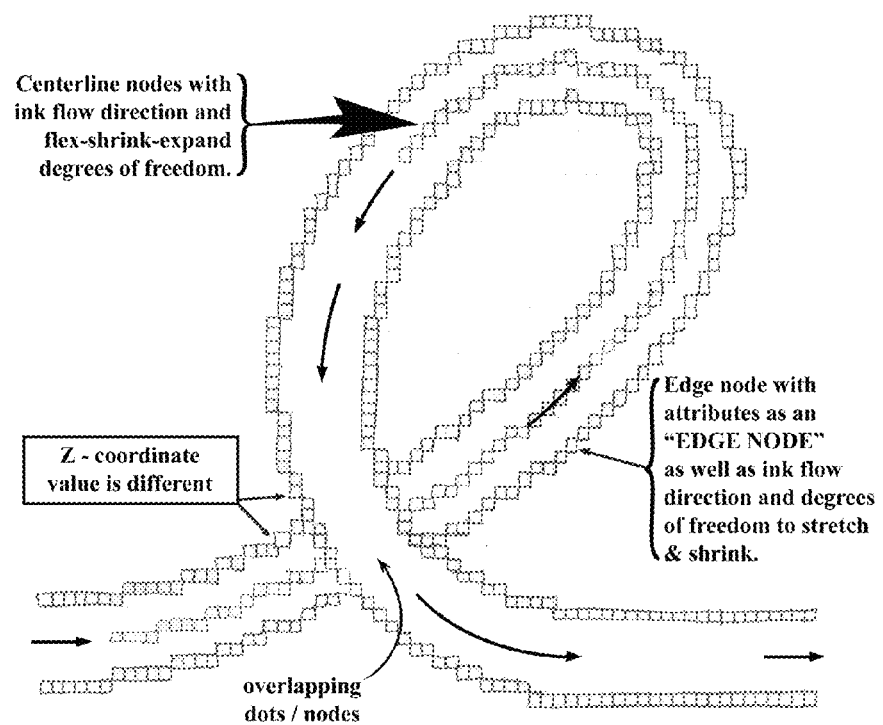
FIG. 12 depicts various pixel-node attributes including handling overlapping lines in an image according to one embodiment.

FIG. 12 also shows nodes with centerline and edge attributes. An example of an attribute for a centerline node is "distance-to-edge-north-west" that denotes the number of nodes to get to the edge node in the north-west direction, which also may be applied to any other direction and to any number of edges. This "distance-to-edge" may be applied in all directions and therefore may require eight unique attribute variables. Another "distance-to-edge" attribute may describe the path along a specified string of directly linked nodes with multiple directions involved. Other attributes that may be added are "ink-flow-direction," which can be used to forecast a node path or string of nodes path which best plots out the path of ink flow or hand stroke in handwriting with respect to the node in which this attribute resides. Additionally, nodes which are not edge nodes or centerline nodes may be "internal nodes" or nodes with an "internal" attribute where it is aware that it is an internal node.

Figure 13A:
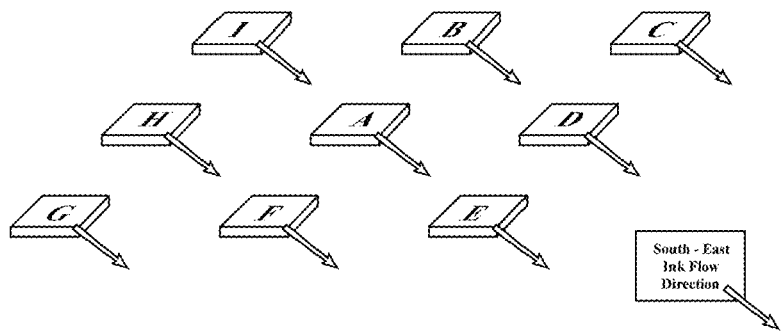
FIG. 13a depicts handwriting ink flow in a south-east direction assigned to pixel-nodes, refer to FIG. 12 overlap nodes.
Figure 13B:
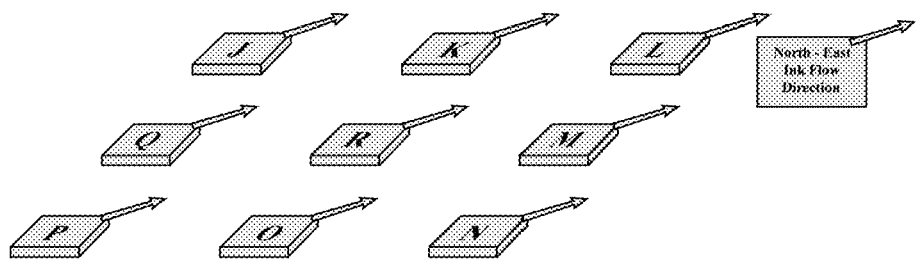
FIG. 13b depicts handwriting ink flow in a north-east direction assigned to pixel-nodes, refer to FIG. 12 overlap nodes.
Figure 13C:
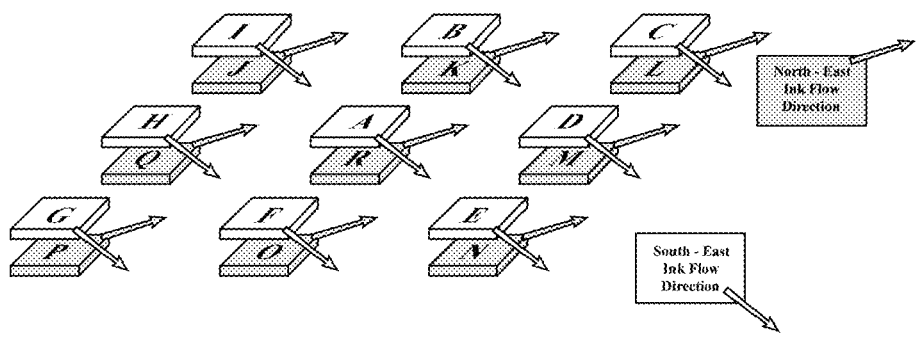
FIG. 13c depicts handwriting ink flow attributes assigned to overlapping pixel-nodes.

FIGS. 13a, 13b, and 13c depict a close up of some of the overlapping dot nodes of FIG. 12, where FIGS. 13a and 13c depict dot node-A with eight neighbors, B through I, in its same Z coordinate level on top and FIGS. 13b and 13c depict nine additional neighbors J through R in a different Z coordinate level just below—where FIG. 13c shows dot node-A with 17 dot node neighbors. There may be no limit to the number of neighbors that a dot node may have. FIGS. 13a, 13b, and 13c also show ink flow direction arrows, which are recorded within each node of the overlap in FIG. 12 where the North-East ink flow direction is the up-stroke of the letter "e" in FIG. 12 and the South-East ink flow direction shows the down-stroke of the letter "e" in FIG. 12.

Having disclosed multi-dimensional linked lists that apply to ink dots, the need for non-ink dot nodes comprising the background area around characters or words may also exist to deal with the background space adjacent to ink areas of an image or dot pattern. It may be necessary to identify certain ink dot nodes as "possible background" nodes in which an ink area may take on or relinquish additional dots where there is a possibility that certain peripheral dots may or may not be ink. In this case such a node may have a weight given to it as to whether it is potentially an ink dot or potentially a background dot.

Other types of dot node attributes and even non-dot node attributes can also exist such as but not limited to the following: handwritten character, line, machine print character, handwritten word, spoken language, spoken dialect, Unicode or other code value, historic time frame, graphic type, ink line thickness, hand stroke directional awareness with regards to relative age of the ink where the first written dot nodes have a "first-created" attribute and subsequent ink dot nodes are "next-created" attributes or "up-line" and "down-line" attributes. Attributes can also be applied to entire word or character entities where such entity attributes contain grammatical and word and sentence contextual information.

There are software processes that act upon new pattern entities and associated Unicode values and store them into the knowledge base 30. These processes convert the character or word one dot at a time to individual dot nodes into the aforementioned multi-dimensional linked list with attributes thereby creating new pattern entities and entering them into the knowledge base. Any, some, or all pattern and dot node and linked list attributes mentioned may be used in indexing the knowledge base 30 entities. By simply looking at a specific dot node attributes or attribute fields in a multidimensional linked list pattern entity, the index may rule out or keep an entity as a potential match.

There are many possibilities as to the different types of dot node attributes or non-dot node attributes that can exist allowing intelligent manipulations and related capabilities to handwriting or machine print characters or words or other data. Such dot nodes and their attributes can consist of small amounts of data or great amounts of data.

Elasticity may also be important for the knowledge base 30 character/word patterns because once they have the ability to stretch and shrink, expand and contract, and move about without losing their Unicode definitions, then these flexible knowledge base characters or words can have greater mobility and adaptability to aid in the character cutting or word cutting process as well as in the matching or recognition process for characters and words on an image file. Another approach to elastic movement of handwritten or machine printed characters or words is to find the centerline of the handwritten, hand printed, or machine printed characters or words and then stretch, move, and otherwise adjust the centerline in which the centerline's immediate surrounding or locally associated dots or pixels will follow their closest centerline dots or pixels.

Figure 14:
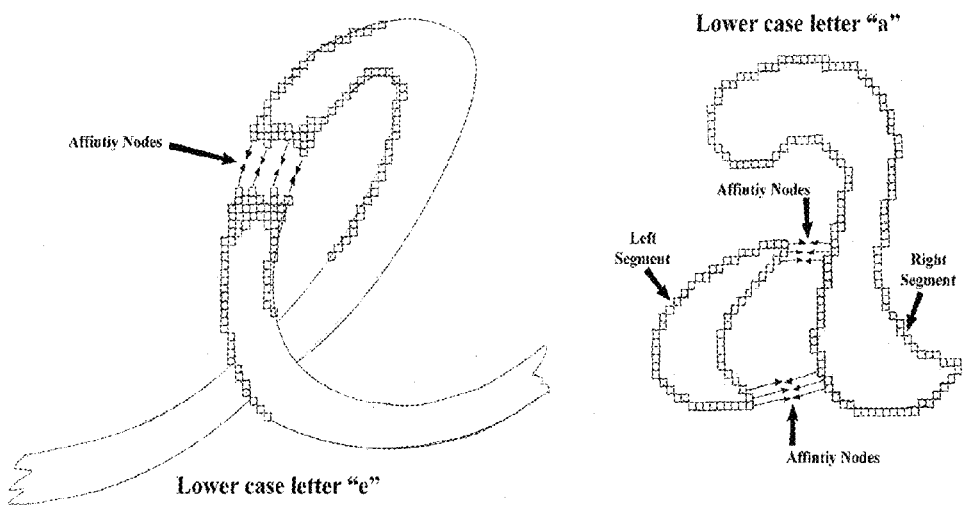
FIG. 14 depicts exemplary affinity nodes bridging across areas that should have had ink.

The knowledge base may have "affinity" nodes where interrupted ink flow or gaps between ink areas in characters or words is bridged by a dot node "affinity" attribute, which associates ink segments together. FIG. 14 depicts a lower case letter "a" on the right with a gap between the left segment and its right segment. The affinity nodes are shown with arrows pointing to their respective counterpart nodes creating an affinity bridge between the two segments.

The handwritten lower case letter "e" on the left in FIG. 14 shows an ink skip or gap where affinity nodes have arrows pointing to each node pair to bridge the ink skip or gap. There can be one or many affinity nodes to bridge the gap and it may be best to bridge every node pair that can be identified. The example of the lower case letter "e" in FIG. 14 shows only four affinity nodes where there may be five additional node pairs in between to be bridged. These affinity nodes are defined as one node per dot in the image where the dots or their nodes are defined in a multi-dimensional linked list and the bridge links between nodes may be one to one or the links may be one to many.

One embodiment of affinity nodes is they can be learned from existing knowledge base affinity nodes where the knowledge base nodes were first defined by the user through the highly interactive user interface learning inputs as discussed below. Once the knowledge base contains sufficient affinity node entities then these entities can be used as a base to define additional new affinity node entities within the knowledge base. Such affinity attributes can be useful in progressive feedback character cutting as well as knowledge base entity matching where ink flow issues present themselves during the character cutting and matching process.

Repulsion nodes are stored in the knowledge base so that they repel other nodes and are useful where two characters or handwritten words are found to overlap or adjoin each other in some manner although they should be separate. Repulsion nodes work the same way as affinity nodes only in the opposite direction. Repulsion nodes are defined as one repulsion attribute per dot node. There may be a one to one or one-to-many repulsion relationship between nodes.

Another difference between repulsion and affinity is the dot nodes are assigned to two separate character or word patterns that may be comprised of separate multi-dimensional linked lists—one list for each separated character or word. Thus, the nodes of the first character or word should have a repulsion towards the overlapping or adjoining nodes of the second character or word. When the characters or words are only adjoining one another and do not overlap, then there only needs to be a division created between the adjoining ink dot nodes regarding which character or word each node belongs to where a repulsion attribute for each node involved establishes this division.

Overlaps are dealt with by duplicating the overlapped dot nodes onto a different Z coordinate level or onto different pattern entities and may be added to the linked list of one of the overlapped characters or words. The overlapped nodes can then be given the repulsion attribute towards their superimposed counterpart nodes. It may be necessary to define additional node attributes such as XY coordinate locations of nodes being repelled as well as other attributes to facilitate the repulsion definition.

Progressive knowledge base 30 feedback and knowledge base 30 matching allows merging-overlapping of two characters or words together, one dot width closer to each other at a time in iterative steps. The merge process will keep track of the overlapped superimposed dots and use them to record the repulsions within each node. This merging process is done to create matches for character or word cutting and for final knowledge base 30 confirmation matching. Once the merged pair of characters is stored in the knowledge base as an entity, it is also stored in the knowledge base 30 as two separate characters or entities.

Repulsion nodes may also be defined when a single character or word needs bled ink to be removed by creating a repulsion node boundary between the bled ink and the character or word pattern's correct edge(s). Hence, this type of repulsion does not involve two characters or words needing to repel one another—but just one character or word needing to repel its own bled ink. This allows the original character or word with bled ink intact or blemishes intact to be stored in the knowledge base with repulsion nodes defining that the bled part of the character or word does not belong, yet also allows matching to take place in case other characters or words have bled in the same manner. In this case, it may be needful to store two versions of this character or word in the knowledge base, one entity having the bled ink or blemish, and the other entity not having the bled ink or blemish.

The method may include a learning mode for dot cutting, character cutting, word cutting and other functions. This learning mode is based on manual user input and among its several functions may record the user's inputs or user input events such as user selected dots, dot patterns, character patterns, word patterns, keystrokes, icon clicks and menu selections in the order they occur as dots are cut from the image file to be recognized and entered into the knowledge base 30. These various events may be stored as character, word, handwriting, etc., dot cutting steps in the knowledge base along with the full dot pattern of the character, word, or other item being cut from the image file, also being stored with the appropriate user supplied Unicode or other code value if one exists. The Unicode or other code value may be manually keyed in or entered by the user, or the knowledge base 30 may already have a verifiable pattern match that provides the Unicode or other code value.

At the lowest level, character cutting and word cutting reduces to individual dots being cut. The dots that are selected and cut from the image file may be contiguous or non-contiguous according to their x-y coordinates. Yet, the dot selection steps are contiguous, from one dot selection step to the next dot selection step, and are recorded as contiguous dot selection steps in the knowledge base regardless of the x-y coordinate proximity of the dots to one another. In other words, in the knowledge base the dots are listed contiguously in the order in which they were cut by the user regardless of their x-y coordinate proximities. This provides continuity to the dot selection steps or the order in which the dots were cut by the user and this continuity or cut order is recorded with the dot pattern in the knowledge base 30.

The dot cutting learning mode may allow steps of the dot cutting process to be recorded in the knowledge base 30 along with the resulting dot pattern entity that was cut. One implementation of recording every dot being cut is to have the learning mode software automatically assign a unique sequence number to each cut dot by assigning number 1 to the first cut dot, number 2 to the second cut dot, number 3 to the third cut dot and so on until the full dot pattern is completely cut. Because there are various icons being clicked and menu items selected during the cutting process, these icon clicks and menu selections may also be recorded with the knowledge base 30 pattern and therefore be assigned in their order of occurrence interspersed between the cut dots.

One implementation of this assignment of sequence numbers is with dots having contiguous sequence numbers such as (0, 1, 2, 3, N), for dot 0 through dot 3 and on to dot N, where in the case of three icon clicks prior to dot 1 takes the form of (dot 0, icon A click1, menu select click2, icon B click3, dot 1, dot 2, dot 3, . . . , dot N), where they are referenced as (0:1) for icon A click1, (0:2) for menu select click2, and (0:3) for icon B click3. In the case of four icon clicks between dot number 3 and dot number 4 they are numbered in this manner: for click number 1, 3:1; for click number 2, 3:2; for click number 3, 3:3; and for click number 4, 3:4; all taking the form (dot #):(click #). This method of referencing recorded dots, clicks, and menu selections may allow for all clicks and menu selections to be referenced between the dot numbers and where all dot numbers are sequentially numbered with no interruptions in numerical order, i.e., where the dots themselves are numbered sequentially as 1, 2, 3, . . . N.

The dot cutting learning mode may record a user's inputs to cut a character, or word, or words, or lines, or form fields, or graphics, or to cut any other item from an image file. Hence, not only is the dot pattern recorded in the knowledge base 30, but also the steps used to cut each dot are recorded as discussed above. These recorded steps may then be referenced by other processes within the recognition system such as the progressive feedback process, which provides inputs into the automated and manual character cutting processes.

A graphical user interface is typically used to allow the user to provide detailed manual mouse/keyboard or other inputs into the dot cutting learning mode and allow the user to manually control the dot to dot cutting process to cut characters, words, and other items. According to one embodiment, the graphical user interface begins with a typical main window with typical menu items starting at the top left of the window such as File, Edit, View, Tools, Window, Help, etc. The main window is sectioned off into smaller sub-windows where each smaller sub-window can be resized smaller or resized larger to take up the entire area of the large window and where each sub-window can be minimized down to an icon at the bottom border of the large window as known in the art. One sub-window displays the original image file and highlights the current active dot cutting execution area. Another sub-window shows a magnified view of the active dot cutting area. Another sub-window displays the pop-up view of the dot cutting paste buffer window. Typical icons as known in the art will be to "rotate" the entire image file, "de-skew" the image file, "select box" and "crop" the image file. Other additional dot cutting and related navigational icons may also be on the main window.

For the manual dot cutting process, the user may select dots by mouse clicks directly on the dots or the user may select dots by selecting direction arrow icons with mouse clicks. Such direction arrow icons may be in the following directions: north, north-east, east, south-east, south, south-west, west, north-west. Additional arrow icons may be used such as Z-level-up and Z-level-down for traversing overlapping characters that exist where their overlapped dots must be duplicated onto a different Z coordinate levels, or for traversing looped handwriting where crossover of ink strokes causes overlapping lines as shown in FIG. 12. Also, an icon that allows the user to duplicate dots onto a different Z level may be necessary such as "duplicate dot to Z level" where it is necessary for the user to define overlapping handwritten lines or for the user to define overlapping machine print characters, for instance, with regard to repulsion nodes.

One embodiment of the user interface allows the user to select, highlight and cut the image dots, characters, words and other items as displayed on the computer screen. When a dot is highlighted, it defaults to bright green or some other color showing it has been highlighted. The default highlight color may be changed to another color by the user. If the user moves the mouse pointer to one of the four edges of the viewable window, then it may pan or move across the image to display what is beyond that particular edge until it reaches the edge of the image itself. Once the user moves the mouse pointer away from the window edge the panning will stop. The user may also position the mouse pointer to any of the four corners of the viewable window to pan or move across the image to display what is beyond that particular corner diagonally allowing the user to see what is beyond that particular corner in both edge directions combined that meet in that corner.

To begin cutting dots the user clicks on the "cut character" icon, or "cut word" icon, or "cut horizontal line" icon, or "cut vertical line" icon, or "cut graphic" icon, or "cut user defined item" icon, or other commands. When finished cutting dots, the user can click on "end cutting" icon. When direction arrow icons are clicked, or the image's dots are clicked on directly, then one dot at a time will be highlighted and is shown as cut on the computer screen. As dots are cut, they are copied to an automatic pop-up paste buffer window that displays the dots being cut.

When an arrow button is clicked, if the next dot to be highlighted is not within viewable area of the computer screen or window, then automatic zoom and automatic pan will change the image's orientation and magnification so that the next highlighted dot is within this viewing area with room to spare. Zoom magnification can also be done manually by the user to both magnification extremes, i.e. to zoom-in enough to view a single dot large enough to fill the entire viewable area of the window or computer screen or to zoom-out enough to view all the image's dots or image file's dots at once in the same viewable area. Hence, the user can control zooming at any magnification to see individual dots up close or to see all the dots of the entire image. The user can also control zooming by clicking on the "zoom box" icon and then select two vertices of a square or rectangle to define the extents of the box which becomes the viewable area of the screen.

Zooming can also be accomplished by the user clicking on a plus (+) icon to zoom-in and by clicking on a minus (−) icon to zoom-out. The user may select to view the dots as squares or circles by clicking on the "view dots as squares" icon or "view dots as circles" icon, or this may alternatively be selected from within the "View" menu item. All of these zooming capabilities mentioned in this paragraph apply to all windows. Additionally, when dots are superimposed, the view may be rotated in three dimensional space showing the Z levels of all dots that exist on different Z levels showing their relationships to one another in three dimensional space.

Other icons that may be used are the "cut back" icon, the "cut forward" icon, the "navigate back" icon, and the "navigate forward" icon, where all of these icons provide the ability to navigate and edit the image being recognized. The "cut back" icon allows the user to back step or retrace through the cutting process and un-cut dots one at a time—where the dots will be un-highlighted one at a time. The "cut forward" icon allows the user to step forward through the cutting process and re-cut dots that had just undergone "cut back" icon clicks. The "navigate back" icon allows the user to move the mouse pointer to retrace back through cut dots without un-cutting them—similar to "cut back" but the dots remain cut and highlighted as such. The "navigate forward" icon is used to move the mouse pointer forward to the end of the cut dots to where more cutting of dots can be resumed. When the "navigate back" and "navigate forward" icons are used, the mouse pointer will show a different highlight color to differentiate itself from the normal cut dot highlight color.

Another implementation of the manual dot cutting as discussed above is a more automatic cutting method: the polygonal boundary periphery method. The user clicks on the "cut defined boundary" icon and is prompted to select dots defining a polygonal boundary around a character or word by clicking the mouse pointer on background dots around the outside of the character or word and then clicks the "cut defined boundary" icon again and the system will threshold and cut everything inside of that periphery. As the user selects the polygonal boundary dots, the system connects the dots one at a time with visible straight lines until the user selects the first dot again to fully enclose the polygon. If a Unicode or other code value exists, the user can then key in the corresponding code value associated with that character or combination of code values if it is a handwritten word or multiple characters. If for any reason the user desires to edit the dots selected by the "cut defined boundary" method the user may invoke the other editing functions described in this section. An alternative name for "cut defined boundary" may be used. Instead of "cut defined boundary," the following name may be used: "cut polygonal boundary."

Another implementation of manual dot cutting allows the user to select an edge dot of a character or word and then click on a "complete periphery" icon. The character cutting software automatically selects and highlights all edge dots and internal dots associated with that character or handwritten word using ink flow algorithms as known in the art as well as thresholding as known in the art along with progressive feedback from the knowledge base as disclosed in this patent. Once the peripheral dots are highlighted then the user is asked to click on the "cut highlighted dots" icon or if further editing of highlighted dots is needed the user may invoke the other editing functions described in this section.

In the case of a handwritten word being cut, the user is also allowed to manually define the cutoff boundary between individual characters of the handwritten word by clicking on the "define handwritten character cutoff" icon. The user will then be prompted to select the dots that define the cutoff between handwritten characters. The cutoff boundary can be defined perpendicular to the centerline of the handwritten lines or the cutoff boundary can be defined as a perfectly vertical line or some other angled line between the characters. If a Unicode or other code value does not exist for the item being cut then the user interface provides a "user defined code" icon for the user to click on to define a custom code for the item, or it may be some other way for the user to specify a user defined code.

The Learning Mode may have additional objectives or functionalities. For example, once a character or word or other item is cut using the learning mode, attributes may be defined to specific dot nodes to allow better definition and handling of the item.

Another set of icons are "affinity dot pair" and "affinity dot group" and "affinity dot edge" and "affinity dot enclosure," which allow the user to select dots to create an affinity link between two ink edges that are separated by a gap or hole made up of non-ink dots. Affinity dots are attracted to one another or have an affinity for one another even though a gap of non-ink dots lies between them. An affinity relationship is defined between two or more ink edge dots to create a bridge across blank areas where there should be ink, or where it is obvious that the two separate ink areas should be associated across a gap. As an example, in a handwritten letter where the ink stops flowing from the ink pen for a short distance, thus breaking the continuity of the ink line and creating a gap, an affinity link can define an attraction between the two ink lines where the gap occurred.

An affinity link can be used on a handwritten character or word or machine printed character in which it is obvious to the user that ink is absent. The "affinity dot pair" icon defines an attraction between two ink edge dots that are separated from one another. It creates a one-to-one affinity between two dots or dot pair. When the "affinity dot pair" icon is clicked on, the user is prompted to select two ink dots to bridge a gap in the ink. Once the two dots are selected, the system highlights them and automatically creates affinity links between the dot node pairs as shown in FIG. 14.

The "affinity dot group" icon creates an affinity between two separate edges across a gap. The two separate edges are two groups of dots selected by the user called Group-A and Group-B. The user clicks on the "affinity dot group" icon and is prompted to select Group-A dots along an edge and is then prompted to select Group-B dots along another edge. A numeric counter display accompanies Group-A, and another counter accompanies Group-B, showing a tally of the total number of dots the user has selected for each group. The user does not have to select an equal number of dots into each Group, but if Group-A and Group-B have an equal number of dots then a one-to-one correspondence or affinity link is created between each dot pair leaving no remainder. If Group-A and Group-B have an unequal number of dots, i.e. 10 dots for Group-A and 15 dots for Group-B, then the system will create a mix of one-to-one and one-to-many affinity links to complete the affinity definition, where the odd links are distributed evenly throughout.

The "affinity dot edge" icon defines affinity links between two separate edges, Edge-A and Edge-B, regardless of the number of dots each edge is comprised of. The following explanations and descriptions are now given: A one-to-one correspondence between the dots of each edge may or may not exist and a one-to-many correspondence is more likely. With a one-to-many correspondence for example, Edge-A dots may be linked to more than one Edge-B dot, where such one-to-many affinity links will be spaced equal distances apart across the entire edge. For example, Edge-A may be comprised of 30 dots and Edge-B may be comprised of 20 dots—yet there is an affinity or attraction between the two edges and the affinity links between Edge-A and Edge-B dots will be distributed evenly.

When the "affinity dot edge" icon is clicked, the user is prompted to randomly select the two endpoint dots of Edge-A and the system highlights these two dots as they are selected. Using the shortest route, the system then automatically highlights and connects all edge dots that lie between the two selected dots. The user then presses the "enter" key or clicks on the "ok" icon and the system saves this edge as the Edge-A. Edge-A needs to be linked across a gap to an Edge-B and therefore the system automatically activates the Edge-B prompt for the user to select two endpoint dots of an entirely different edge.

Once selected, the system automatically highlights all edge dots along the shortest route between the two selected dots. After the user hits the "enter" key or clicks on the "ok" icon Edge-B is saved with an affinity link to Edge-A. Hence, the "affinity dot edge" icon prompts the user to select dot number 1 and dot number 2 for Edge-A and then select dot number 3 and dot number 4 for Edge-B where selected dots 1 and 3 have an affinity link to each other and selected dots 2 and 4 are linked together with an affinity and where all other dots are spaced evenly with one-to-one or one-to-many affinity links.

The "affinity dot enclosure" icon or menu selection is for bridging across a hole or void or irregular area of non-ink dots which should be all ink dots. The non-ink dots are enclosed on all sides, or at least nearly so, by the affinity dots. The user selects the "affinity dot enclosure" icon and is prompted to select at least one ink-dot, which forms the periphery around the hole or void or irregular area and the user selects the option to complete the periphery. Then the periphery is completed by the system by its creating affinity-enclosure attributes in the periphery nodes and then creating ink-void attributes in the hole or void non-ink dot nodes. If the periphery is not contiguous the user is allowed to select and create a periphery bridge between the closest ink dot nodes to complete the periphery.

The "repulsion boundary" icon or menu selection allows two characters or words that touch but do not overlap each other to be defined with a repulsion boundary where the characters or words repel each other along that boundary. The user selects the "repulsion boundary" icon and then selects the dot pairs that repel each other, where one dot of the pair belongs to character-A or word-A and the second dot of the pair belongs to the character-B or word-B. There may be a one to one or one to many relationship between repelling dots. Once the user has picked enough dots to define the entire boundary, then the icon is clicked again to complete the repulsion definition. This serves to separate two characters or words from one another and creates three knowledge base entities: the two separated characters or words and the conjoined pair. As such, the user is then prompted to store each separated character or word as separate entities within the knowledge base.

The "repulsion patterns" icon or menu selection allows two character or word patterns to be compared manually. The user chooses the "repulsion patterns" icon or menu selection and is prompted to choose one pattern that is known from the knowledge base and a second known pattern from the knowledge base or chooses a second unknown pattern that is currently being cut from an image. The user is allowed to overlay the patterns by positioning, scaling, and rotating one pattern on top of the other pattern. The user is then prompted to complete the repulsion, which creates a repulsion between the two patterns showing where their dots over-run or under-run. Either pattern may be saved to the knowledge base with the repulsion boundary created. This is like taking a pattern shaped like a letter "A" and placing it over another pattern shaped like a "B". Where they differ, a repulsion boundary can be created on one or the other or both patterns. One or both of the patterns can then be saved as new entities in the knowledge base with their respective repulsion boundaries intact.

The "repulsion dot" icon allows a single character or word that has bled ink or other unwanted ink appendages to have a series of repulsion dots or boundary of dots that repel the unwanted appendage(s). The user selects the "repulsion dot" icon and then selects dots that repel each other until an entire boundary is created. The dots repelling each other may be in a one-to-one or a one-to-many relationship. The character or word can then be stored as two different but same character code knowledge base entities.

The "repulsion overlap dot" icon may be clicked on when two characters or words overlap one another by ink bleeding, machine print overlaps, or handwriting overlaps or by some other cause. The user selects the icon and is prompted to select the repulsion overlapped dots and then the user is prompted to select the first character or word and is then prompted to select the second character or word. Overlapped dots are then duplicated so that each character or word has sufficient dots to be a complete or whole character or word dot pattern. This serves to separate two characters or words and creates three knowledge base entities: the two separated characters or words and the overlapped pair.

The "overlap dot" icon may be clicked on when two separate characters or words overlap one another either by ink overruns, machine print overlaps, or handwriting overlaps or by some other cause. When the "overlap dot" icon is clicked on, the user is prompted to select the overlap dots. When finished selecting them, the user is prompted to select the first character or word and then is prompted to select the second character or word. The overlap dots are then duplicated onto two different Z coordinate levels along with their respective character or word. The "cut overlapped" icon is then used to cut each character or word separately along with their respective overlap dots and they may be stored separately in the knowledge base.

Alternately, both characters or words may be stored as overlapped or conjoined character pairs or word pairs in the knowledge base with associated Unicode or other code values assigned to them in the proper reading order using the icon "cut overlapped." During this process, the user is prompted to key-in Unicode values for each character or word. During this process the system may define repulsion nodes for these overlapped dots.

The "trace hand strokes" icon or "trace handwriting strokes" icon may also be used to allow the system to learn the hand strokes involved in a handwritten word where the user uses a touch pad or mouse to trace over a handwritten word to allow the system to learn the hand strokes involved in a particular handwritten word. This learning mode feature allows the system to record the strokes necessary in handwritten characters and words. The "add dot" and "remove dot" icons may also be available to the user to manually edit patterns while they are being cut.

When finished cutting the character or word, the user clicks on "save entity" and is prompted to key-in a Unicode value for the character or word. If a Unicode value does not exist for the item being cut then the user interface will also provide a "user defined code" icon for the user to click on where they may define a user defined code for the item being cut. In addition, the user may click on "start background" icon or "end background" icon which prompts the user to define dots that are background and not ink around the area of the character or word.

Hence, the user has worked with the system to create background definitions to train the system in the thresholding process by defining what dots constitute the non-ink background or blank page areas around the characters or words. The system may then store not only character and word pattern definitions but also background grayscale non-ink attribute information for a contextual purpose. Not only therefore is the pattern definition of the character or word saved but also their surrounding backgrounds.

The system may continuously try to recognize the item, character or word while the user manually cuts characters or words or other entities. If a high confirmation or confidence verifiable match is not found, the user is prompted to key-in the Unicode value(s) for the character or word. The system then stores or commits the user's keyed-in Unicode or other code value(s) to the knowledge base 30 along with the character or word's dot pattern and learned cutting steps.

The "select dot" icon or menu item allows the user to manually select a single dot at a time where each dot is highlighted as it is clicked on by the user.

The "select dot polygonal boundary" icon or menu item allows the user to select a group of dots by defining a polygon boundary around the group of dots where each dot in the group is highlighted as the boundary is completed.

The "threshold minus" icon or menu item allows the user to manually adjust thresholding on a pattern or selected area of an image page. It allows the user to remove dots from a selected and highlighted group of dots or dot pattern(s) or a bounded area of an image page as it is thresholded so as to decrease the size or remove dots from the periphery of the character or word dot pattern or other pattern. This may apply to grayscale, color, and black and white (binarized) dot patterns and images.

The "threshold plus" icon or menu item allows the user to manually adjust thresholding on a pattern or selected area of an image page. It allows the user to add dots from a selected and highlighted group of dots or dot pattern(s) or a bounded area of an image page as it is thresholded so as to increase the size or add dots to the periphery of the character or word dot pattern or other pattern. This may apply to grayscale, color, and black and white (binarized) dot patterns and images.

The "edit knowledge base entity" icon or menu item allows the user (with appropriate access rights) to look through the knowledge base to examine entities, using the editing icons noted herein to modify, re-save, and delete knowledge base entities. The user may search one knowledge base entity at a time or key in knowledge base character codes(s) to search for and find the knowledge base entity in question.

The "save as knowledge base entity" icon allows the user to save highlighted dots as a knowledge base entity wherein the user is prompted to key in character codes for a single character, a dual character such as a ligature, or multi-character such as a word entity.

Through this method of user input, the knowledge base learns and records all inputs which may be used for future automated recognition processes.

As the system becomes accustomed to or learns a just encountered handwriting style, hand print, or machine print style on the same page or pages, it may begin using these just learned entities to recognize the remaining patterns in the vicinity of that page or pages. This may be called locally adaptive recognition. The knowledge base may have recorded attribute information attached to pattern entities such as "authorship", "font", "handwriting style", or "hand printing style" that may be used for recognition purposes. Handwriting styles, font styles, or fonts are attributes stored with each recorded pattern in the knowledge base.

The user may modify, add, or delete any knowledge base entity's dot pattern's shape, attribute(s) or other feature which defines it using the same menu icons, functions and features disclosed above by calling up the pattern entity using the "edit knowledge base entity" icon. When this icon is clicked, the system will go into learning mode to record all edits the user makes and will create a new entity to replace the old entity. The old entity will be retained in the knowledge base 30 but will be rendered inoperative or inactive and the newly edited entity will become the active one. The user may also roll back the new entity back to the old entity re-establishing it as the active entity.

When existing image rotation algorithms as known in the art are not used, two other methods of rotating an image or dot pattern may be used. The first rotation method is a literal rotation of an image or dot pattern in integer coordinate space using a nearest neighbor approach. The second rotation method is a virtual rotation of an image or dot pattern, in floating point coordinate space using real numbers, by virtually rotating point-grids assigned to each image dot. Both methods may employ common prior mathematical and trigonometric approaches.

Prior to any rotation of an image or dot pattern, the image's coordinate system may need to be converted over to the Cartesian Coordinate System to facilitate rotation mathematics, where the origin or (X=0, Y=0) address may be arbitrarily located anywhere in the image and where rotation takes place about this (X=0, Y=0) origin. Whether rotating literally or virtually, image distortion due to rotation is minimized when each rotation starts at the image or dot pattern's un-rotated position; angles of rotation may be increased or decreased in size as long as the actual rotation starts at the image or dot pattern's original un-rotated position. Rotation angles may be calculated in radians or in degrees. Rotation examples described here use the standard trigonometric functions arctangent, sine, and cosine as known in the art with as many floating point decimal places of accuracy as possible and practicable for calculating coordinates and angles to insure accuracy.

Figure 15:
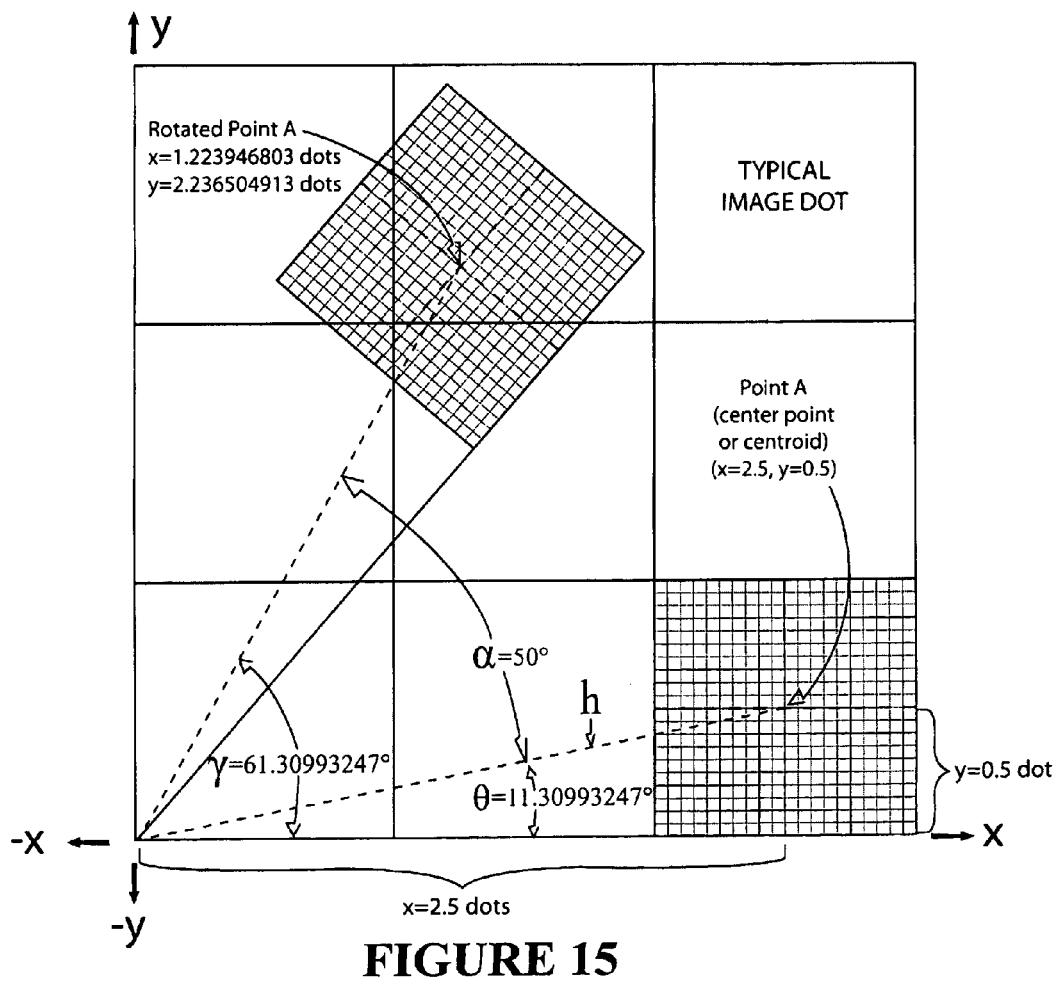
FIG. 15 depicts an exemplary nearest neighbor image dot rotation and associated mathematics.

Both the literal and virtual rotation methods typically use similar mathematical steps. As depicted in FIG. 15, the steps may be:

(1) Determine the angle of rotation a (alpha) in which to rotate the image or dot pattern. This angle is a positive number for a counterclockwise rotation or a negative number for clockwise rotation. This angle can be determined in countless ways. It can be arbitrary or a number that is incremented a millionth of a degree or some other smaller or larger increment of a degree. Or it can be any degree such as one degree or two degrees and so on.

(2) Determine a point within an image dot (Point A) to be rotated. (Note: Point A is only a point and takes up no space. There is an infinite number of Point A's that can be found within the confines of one image dot or pixel. This point may be the centroid of an image dot or it may be located somewhere else on an image dot—a Point A is not to be confused with an image dot or pixel.) This point and its location are further explained next.

(3) Determine the x and y coordinates of Point A.

(4) Determine the angle θ (theta) made between Point A, the origin, and the positive x-axis using the trigonometric equation "θ=arctangent(y/x)" where y and x are the coordinates of Point A. See paragraphs below to determine when arctangent may be used and when it may not be used.

(5) Add angles α and θ together to make angle γ (gamma), where γ is the angle made between rotated Point A, the origin, and the positive X axis.

(6) Determine the straight line distance 'h' between Point A and the origin by using the Pythagorean Theorem $h^2=x^2+y^2$ where x and y are the coordinates of Point A.

(7) Knowing 'h' and 'γ' from steps 5 and 6 above, the coordinates x and y of rotated Point A can now be solved for by using trigonometric sine and cosine functions in the following equations:

$$x=h(\cos\gamma) \text{ where x is the rotated Point A's x coordinate and } y=h(\sin\gamma) \text{ where y is the rotated Point A's y coordinate.}$$

(8) Having successfully rotated Point A by obtaining its rotated x and y coordinates, rotated Point A should be stored for later use. Repeat steps 1 through 8 for all other points that need rotation.

With regard to Step 4 above: In calculating the arctangent using a single-argument arctangent function, the following rules apply to calculating Point A's angle θ (theta) location: Quadrant Angle θ solution using single argument arctangent function I For x>0 and y>0, θ=arctangent(y/x)

II & III For x<0, θ=arctangent(y/x)+180°

None For x=0 and y>0, θ=90° (arctangent is undefined and not required)

None For x=0 and y=0, (arctangent is undefined and no rotation is required)

None For x=0 and y<0, then θ=270° (arctangent is undefined and not required)

IV For x>0 and y<0, then θ=arctangent(Y/X)+360°

For the nearest neighbor literal location of an image or dot pattern in an integer coordinate space, again refer to FIG. 15. Point A is in the center or is the centroid of dot location (x=3, y=1) where the centroid Point A has coordinates (x=2.5, y=0.5). Using steps 1 through 8 from above, the nearest neighbor method of rotation is demonstrated as follows:

(1) The angle of rotation α=50°.

(2) Point A is the center or centroid of image dot x=3 and y=1.

(3) Point A's coordinates are 3−0.5=2.5 and 1−0.5=0.5, therefore Point A's x coordinate is 2.5 and Point A's y coordinate is 0.5.

(4) The angle θ (theta) made between Point A, the origin, and the positive x-axis using the trigonometric equation "θ=arctangent(y/x)"=θ=arctangent (0.5/2.5) =θ=11.30993247°

(5) Adding angles α and θ together gives: γ=50°+ 11.30993247°=γ=61.30993247°

(6) Determine the straight line distance 'h' between Point A and the origin by using the Pythagorean Theorem $h^2=x^2+y^2$ where h=sqrt($x^2+y^2$), where x=2.5 and y=0.5. Solving the equation h=sqrt$(2.5)^2+(0.5)^2$=h=sqrt(6.25+0.25)=h=sqrt (6.5)=h=2.549509757 dots.

(7) Knowing 'h' and 'γ' from steps 5 and 6 above, the coordinates x and y of rotated Point A can now be solved for by using trigonometric sine and cosine functions in the following equations:

$x=h(\cos \gamma)$ where x is the rotated Point A's x coordinate and $y=h(\sin \gamma)$ where y is the rotated Point A's y coordinate.

Rotated x coordinate=$h(\cos \gamma)$=(2.549509757)[cos (61.30993247°)]=1.223946803 dots.

Rotated y coordinate=$h(\sin \gamma)$=(2.549509757)[sin (61.30993247°)]=2.236504913 dots.

(8) The result is a rotation of Point A by obtaining its rotated x and y coordinates.

(9) The nearest neighbor for rotated Point A falls within the dot that resides at x=2 and y=3:

Where the x coordinate of rotated Point A=(1.00000001<1.223946803 2.00000000)=2 and Where the y coordinate of rotated Point A=(2.00000001<2.236504913<3.00000000)=3. Therefore, the dot x=3 and y=1 gets rotated 50° degrees to its nearest neighbor position x=2 and y=3.

(10) Repeat steps 1 through 9 above for every dot in the image file that needs to be rotated using the nearest neighbor method.

Figure 16:
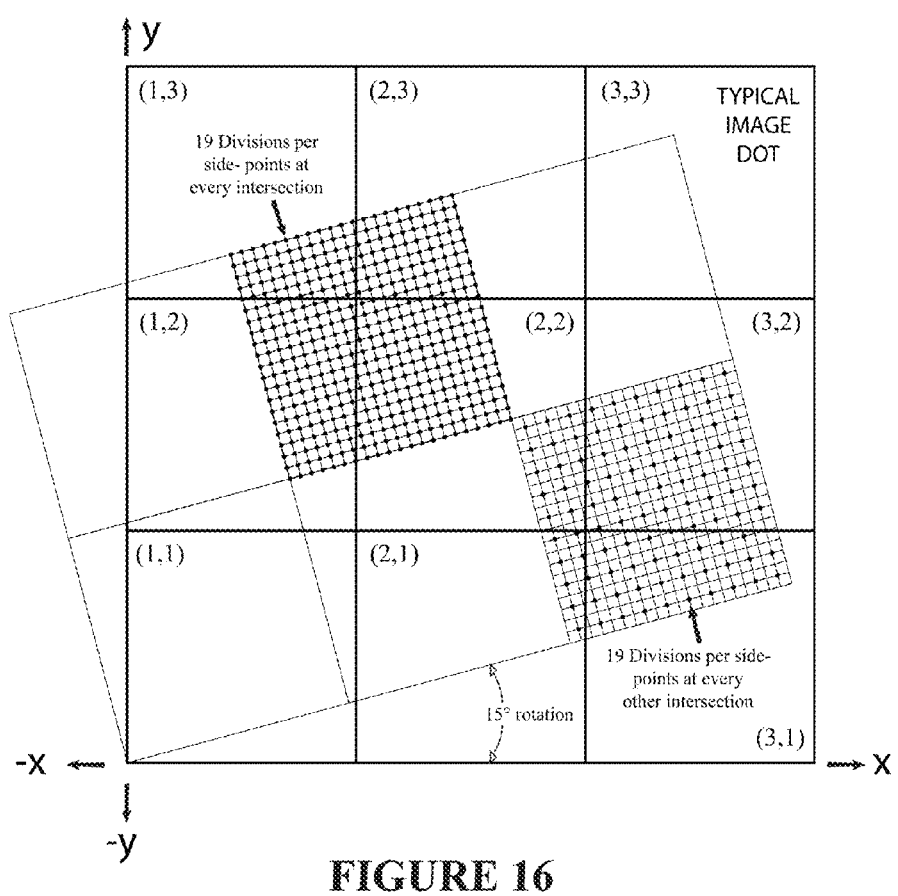
FIG. 16 depicts an exemplary multi-point virtual rotation.

For the virtual rotation of an image or dot pattern in floating point coordinate space using real numbers, refer to FIGS. 15 and 16. To minimize data loss during rotation, a virtual rotation may be done by defining any number of points which occupy no space and placing them equally distanced from one another within each image dot (image dots do occupy space). The points will take on the color, grayscale, or black and white characteristics of the image dot inside of which they are placed.

The image dots to be rotated has these points placed inside of them as shown in FIG. 16. These defined points are equally distanced from one another by dividing an image dot with any number of equally spaced divisions per side. For example, to create 20 equal parts per side, add 19 equally spaced division lines per side between the exterior walls of the image dot as shown in FIG. 15 and FIG. 16. Points occur at division line intersections, with each other and with the outer edges of the image dot, or points may occur at every other intersection as shown in FIG. 16. There may be other point-intersection solutions as well, where only two such solutions have been disclosed here.

The number of defined points per image dot may vary. Each point is rotated using the same point rotation methods described above. These points may be stored in array variables and recalled for matching purposes. After rotation, the points will reside above certain image dots as shown in FIG. 16. For example, in FIG. 16, the image dot located at position (3, 1) has 29 rotated points residing above it. These 29 points represent approximately 29 percent coverage of its total 100 points. Such percent coverage's are used in aggregate percentage matching calculations where each percent coverage represents a coverage weight—where the higher percentage coverage equals the higher weight in the matching process.

When points are placed inside of an image dot, the points take on the image dot's grayscale, color, or black and white values as well as other features of the image dot including its XYZ coordinate except as follows: (a) points may have two coordinate addresses—they retain the image dot's XY and possibly a Z coordinate and also take on its own XY and possibly a Z coordinate, (b) points may be grouped or associated together in a linked list, array, or some other data structure, (c) points may be associated or linked back to their original image dot which may take the form of image dot number "one" divided into 100 or some other number of points with each point identified back to image dot number "one" and where image dot number "two" is divided into 100 or some other number of points with each point identified back to image dot number "two", and so on. In the matching process, only one pattern at a time may be divided into points and rotated. When rotated, an image dot with its points may reside above multiple image dots of the underlying second pattern as shown in FIG. 16.

When two dot patterns are being matched to each other and they are not the same size but may be similar shapes, then one dot pattern may be virtually scaled to the size of the other dot pattern. Virtual scaling may be done in a way that it should not add nor take away image dot information from either dot pattern being matched.

Figure 17:
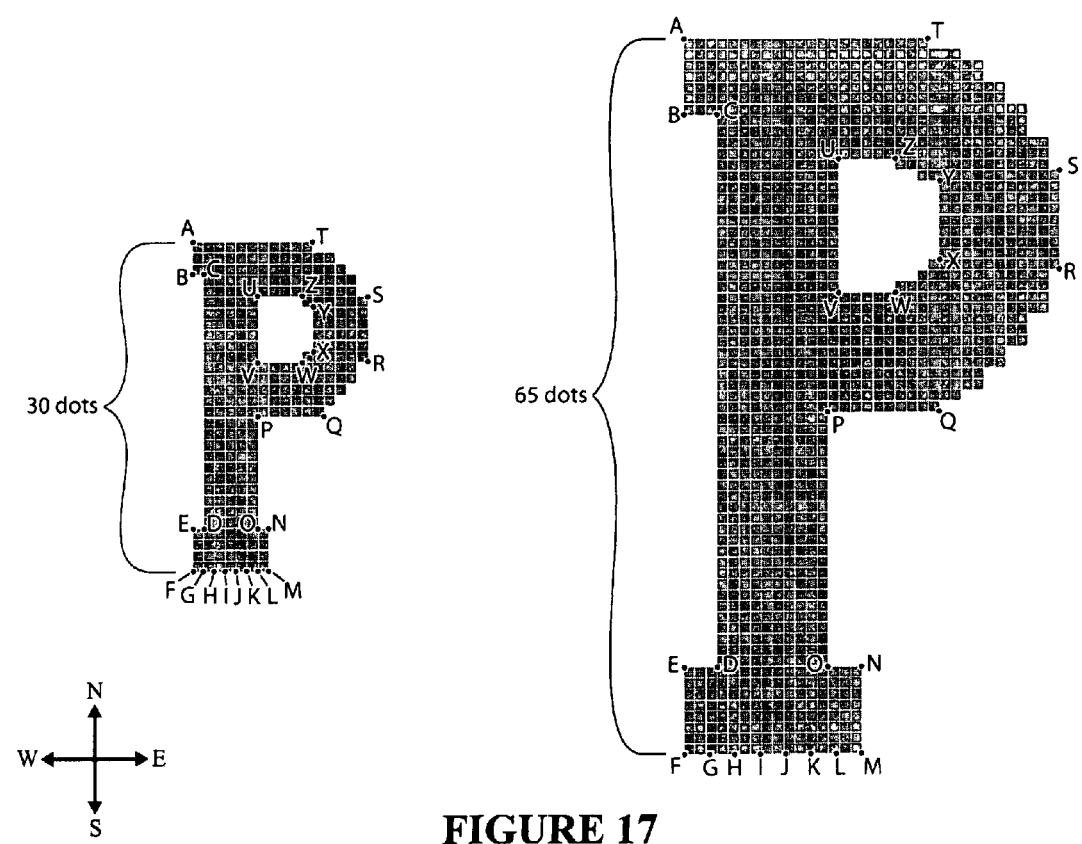
FIG. 17 depicts an exemplary two character virtual scaling and matching according to one embodiment.

FIG. 17 shows two different sized dot patterns of a letter 'P'. Image dot vertices are labeled 'A' through 'Z' and are placed at the main vertices of both letter 'P' dot patterns. The vertex labeled 'A' on the small dot pattern can be mapped to the vertex labeled 'A' on the large dot pattern and so forth for subsequent vertices 'B' through 'Z'. These mapped vertices are threads of commonality between the two dot patterns. Also, the height of large dot pattern 'P' is 65 image dots and the height of small dot pattern 'P' is 30 image dots. This is important because the ratio of 65 divided by 30 gives 2⅙, or large dot pattern 'P' is two and one sixth dots for every dot on small dot pattern 'P'. This means that large dot pattern 'P' is 2.1666666667 times taller than small dot pattern 'P'. This is the "height difference ratio".

Regarding the small dot pattern 'P' the following may be used: With vertex 'A' as the focal point, where vertex 'A' resides on the upper left corner of image dot 'A', vertex 'B' is three image dots to the south of vertex 'A', where vertex 'B' resides on the lower left corner of image dot 'B'. Vertex 'C' is three dots south and one dot east of vertex 'A', where vertex 'C' is the lower left corner of image dot 'C'. With vertex 'A' as the focal point, offsets can be calculated from vertex 'A' to all other vertices 'B' through 'Z' in the same manner. With vertex 'B' as the focal point, offsets can be calculated from vertex 'B' to all other vertices including 'A' and 'C' through 'Z'. This process can be repeated for all other vertices taking their turn being the focal point.

These offset relationships for each focal point can be stored in program variables such as arrays, etc., and used to determine a dot pattern's shape relative to a number of focal points on that dot pattern. In addition to all image dot offsets as just noted in this paragraph, a more exact offset calculation between all vertices as just described in this paragraph, in their many relationships as focal points and related offsets, can be calculated by using the algebraic formula for the straight line distance between two points as follows: length=sqrt$((X_2-X_1)^2+(Y_2-Y_1)^2)$. Hence, all of the relationships between all focal points and all of their offsets can be calculated more precisely using the preceding straight line length formula.

Using the "height difference ratio" of 2.1666666667 from above as a scale factor, the "height difference ratio" can be multiplied against all offsets (calculated with: length=sqrt$((X_2-X_1)^2+(Y_2-Y_1))^2$ of all focal points to scale the small dot pattern 'P' into a larger "scaled up" dot pattern 'P'. These scaled up focal points and offsets of the small dot pattern 'P' can then be matched against the focal points and offsets of the actual large dot pattern 'P' of FIG. 17. Likewise, using the same approach, the large dot pattern 'P' of FIG. 17 can be scaled down to be matched against the small dot pattern 'P' of FIG. 17 using a scale down ratio by dividing 30 by 65 equaling 0.461538461.

Another embodiment of this method is to define many points within each of the image dots depicted in FIG. 17, such as 100 points or more per image dot as illustrated by the created points in FIG. 16, and choose specific focal points and calculate offsets using: length=sqrt(($(X_2-X_1)^2+(Y_2-Y_1)^2$)) and storing these offsets in array variables, etc. to be used to create a much more precise virtual scaling up or virtual scaling down, due to the many points created. This allows a matching technique using aggregate percentage matching as explained above.

Scaling up from a smaller dot pattern may create jagged edges. This can be alleviated somewhat by filling in the valleys jutting inward toward the center of the dot pattern, which valleys reside between the peaks jutting outward from the pattern, such as the scaled up version of the small dot pattern 'P' of FIG. 17. With this fill-in method, the jaggedness can be interpolated to be somewhat less pronounced and may produce a better match. Nevertheless, this method may also not be performed due to its potential introduction of data that does not exist, being a potential cause of inaccuracy.

It is also noted that points 'G' through 'L' of FIG. 17 are equally spaced between points 'F' and 'M' and all reside on both dot patterns of FIG. 17. These points are shown to illustrate how points 'G' through 'L' on the small dot pattern reside on the corners of dots and their corresponding points 'G' through 'L' are equally spaced from each other on the large dot pattern and thus do not reside on the corners of any dots. This illustrates how spacing can be done between patterns when selecting locations for points to be placed and represents another embodiment of this method of scaling and mapping points between the two patterns in FIG. 17.

FIG. 17 shows two separate and distinct dot patterns of a letter 'P' that are not identical. The large dot pattern 'P' is to be considered as being cut from an image file to be recognized and the small dot pattern 'P' exists as a known pattern entity in the knowledge base.

The above Methods of Virtual Scaling of an Image or Dot Pattern is further clarified in the algorithm described below, with one exception: that of explaining an additional embodiment of virtual scaling using a "width difference ratio" in place of a "height difference ratio":

When two dot patterns are being matched to each other and they are not the same size but are relatively similar in shape, then the larger dot pattern may be virtually scaled down to the same height, and therefore size, as the smaller dot pattern prior to performing a virtual match operation. It is also possible to virtually scale up the smaller dot pattern to the same height, and therefore size, as the larger dot pattern. There is a possibility that the subsequent matching process may yield less accurate results. Nevertheless it is described herein. It is also possible to virtually scale two relatively similar shaped dot patterns to the same width where the "height difference ratio" stated herein would be replaced with a "width difference ratio".

Step 1: Map common points, which points take up no space, between the two dot patterns by placing the same number of points on each pattern in relatively the same positions on each pattern, where point 'A' placed on the upper left corner of the smaller pattern maps to a similarly placed point 'A-prime' placed on the upper left corner of the larger pattern and so on for all the points. There is no limit to the number of points used, and it should be noted that placing points such that they accurately map to each other on both patterns means that they may not align exactly with a pattern's dot corners or centers of dot edges, etc.

Step 2: With common points on each pattern, take the largest pattern and choose one of its points to be the focal point. Then calculate rise over run offset distances and straight line offset distances between this focal point and all other points on the largest pattern. Repeat this entire process with each point on the largest pattern taking its turn as the focal point. Save all information for later use. Repeat Step 2 with the smaller dot pattern using its mapped common points.

Step 3: Calculate a height difference ratio between the two dot patterns (i.e. the shortest pattern's height divided by the tallest pattern's height).

Step 4: Using the "height difference ratio" between the two dot patterns, virtually scale down the largest pattern as follows: Multiply the height difference ratio against all offset distances for each focal point on the largest dot pattern and save the results. Then plot all points using their scaled down offset distances. This has virtually scaled down the largest dot pattern's height to equal the smaller dot pattern's height.

Step 5: Using an inverted height difference ratio between the two dot patterns, virtually scale up the smallest pattern as follows: with the height difference ratio created by the largest pattern's height being divided by the smallest pattern's height (largest/smallest), multiply this ratio against all offset distances for each focal point on the smallest dot pattern, then plot all points using their scaled down offset distances. This has virtually scaled up the smallest dot pattern's height to equal the largest dot pattern's height.

Step 6: The larger pattern's virtually scaled down point offset distances can now be compared with their commonly mapped counterpart distances on the original smaller pattern to see how closely they match, for example, the smaller pattern's rise over run and straight line offset distances between points 'A' and 'B' may be compared with the rise over run and straight line offset distances between points 'A-prime' and 'B-prime' of the virtually scaled down larger pattern, and so on for all offset distances for all commonly mapped points. Likewise, the smaller pattern's virtually scaled up point offset distances can now be compared with their commonly mapped counterparts on the original larger pattern to see how closely these offset distances agree, and hence, how closely these two patterns match. It should be noted that a better match may be achieved when scaling up a smaller pattern by smoothing over the scaled up pattern's jagged edges, which introduces some interpolation that may or may not be desirable. The smoothing over of jagged edges can only be done by choosing a very large number of commonly mapped points between the two patterns where said points would be strategically placed such that they smooth over jagged edges on the smaller dot pattern shape prior to its being virtually scaled up. Elasticity can also be accomplished by finding the centerline of a handwritten cursive letter or word and then modifying the shape of the centerline somewhat and where the surrounding or neighboring pixels or dots will follow the movement of this centerline. Elasticity can alternatively be controlled and manipulated, such as stretched, flexed, shrunk, thinned, thickened, etc., by moving elastic control dots that have been strategically placed throughout the pattern entity where all other pixels/dots of the pattern entity have an affinity link to their nearest elastic control dot. These elastic control dots may be on the edges or along the center lines of handwriting or hand printed or machine printed ink lines. These elastic dots are control points which when moved result in elastic movement of the handwriting or hand printing or machine print. The elastic control dot color may be defined by the user as any color.

Also, the manual user input Learning Mode mentioned above may be employed in this context to allow the user to click on an icon or menu item entitled "define or edit elastic control dots" to strategically define and place an elastic control dot or dots anywhere on or near the knowledge base pattern entity the user sees fit. The user may also define elastic degrees of freedom using the Learning Mode mentioned above with additional icons or menu items as: "define elastic character stretch", "define elastic character shrink", "define elastic word stretch", "define elastic word shrink", "define elastic line thickening", "define elastic line thinning", "define elastic bend", "define elastic sway movement", and other elastic movement functionalities as are needed.

Defining elasticity into pattern entities may require extra background space for patterns to change shape. Therefore, if the user adds new elastic control dots or moves existing elastic control dots near—but not directly on—the pattern entity, additional background dots may be automatically populated or added to create more background space to the pattern entity where the user's pointer is tracking. These extra background dots may be added automatically by the elastic control dot editing process. The user may use the mouse to point with or may use any of the direction arrow icons to make the pointer track to different locations on or around the pattern entity. Also, each pattern entity dot residing in the vicinity of an elastic control dot may be automatically given an affinity attribute to be loosely or closely tied to that elastic control dot. The closer a pattern entity's dot is to the elastic control dot, the stronger weight of affinity is given to that pattern dot in reference to that elastic control dot. Pattern dots may have affinities and affinity weights assigned to more than one elastic control dot. The user may click on pattern dots to view and edit these affinity weights.

The elastic functionalities may not necessarily use these existing names just mentioned and may be modified in their final implementation and their functionalities may be increased or added to and therefore are not limited to those just mentioned here. This learning mode allows the knowledge base 30 and its pattern entities to be trained with elastic movement abilities and attributes where all such training may be used or applied across the knowledge base 30 to similarly shaped entities entered therein. As the knowledge base 30 is trained with elastic movement abilities there may be less manual user input Learning Mode training required since the knowledge base 30 may apply this learning to other similarly shaped entities.

First, the user selects the icon or menu item entitled, "edit knowledge base entity". Then the user may choose the elasticity icons or menu items mentioned above. When finished editing the user may choose the icon or menu item, "save as knowledge base entity" to commit the edited entity as a new entity to the knowledge base. The new knowledge base entity is associated back to its original knowledge base entity it was created from with a parent-child relationship—the original entity being the parent and the new entity being the child. The new child entity is in effect the complete parent entity with added elastic information and saved as a new entity. The elasticity editing icons or menu items are explained in more detail as follows:

"define or edit elastic control dots"—the user selects this icon or menu item and is allowed or prompted to edit, delete or place one or more elastic control dots on or near the knowledge base pattern entity. If control dots are placed directly on the pattern then the control dots are superimposed on top of existing pattern dots. Control dots may also be placed near the pattern entity. Additional background dots may be automatically populated or added to the background area where the mouse pointer is tracking off the pattern. This edited pattern entity with its newly defined and edited background dots, affinity attributes, affinity weights and elastic control dots are then saved in the knowledge base as a new entity when the user chooses the "save as knowledge base entity" icon or menu item.

"define elastic character stretch"—the user selects this icon or menu item and is prompted to select one or more elastic control dots to be moved. The user then moves the elastic control dots to cause the character pattern to stretch, to lengthen lines, to lenghten and reshape curved lines, and to add height to loops, etc. One or more stretch operations may be defined on a pattern entity. When the user chooses the "save as knowledge base entity" icon or menu item, the stretching motion(s) just defined by the user for this character pattern are then saved with the entire pattern entity as a new knowledge base entity.

"define elastic character shrink"—the user selects this icon or menu item and is prompted to select one or more elastic control dots on or near the pattern entity to be moved. The user then moves the elastic control dots to cause the character pattern to shrink, to shorten lines, to shorten curved lines, and to reduce the height of loops, etc. One or more shrinkage operations can be defined on a pattern entity. When the user chooses the "save as knowledge base entity" icon or menu item, the shrinking motion(s) just defined by the user for this character pattern are then saved with the entire pattern entity as a new knowledge base entity.

"define elastic word stretch"—the user selects this icon or menu item and is prompted to select one or more elastic control dots to be moved. The user then moves the elastic control dots to cause the word pattern or portions of the pattern to stretch, to lengthen lines, to lengthen curved lines, and to add height to loops, etc. One or more stretching operations can be defined on a pattern entity. When the user chooses the "save entity" icon or menu item, the stretching motion(s) just defined by the user for this word pattern are then saved with the entire pattern entity as a new knowledge base entity.

"define elastic word shrink"—the user selects this icon or menu item and is prompted to select one or more elastic control dots on or near the pattern entity to be moved. The user then moves the elastic control dots to cause the word pattern to shrink, to shorten lines, to shorten curved lines, and to reduce the height of loops, etc. One or more shrinkage operations can be defined on a pattern entity. When the user chooses the "save as knowledge base entity" icon or menu item, the shrinking motion(s) just defined by the user for this word pattern are then saved with the entire pattern entity as a new knowledge base entity.

"define elastic line thickening"—the user selects this icon or menu item and is prompted to select one or more elastic control dots on or near the pattern entity lines, curved lines, etc., to be thickened. The user then moves the elastic control dots to cause the character pattern lines, curved lines, etc., to thicken. One or more thickening operations may be defined on a pattern entity. When the user chooses the "save as knowledge base entity" icon or menu item, the thickening motion(s) just defined by the user for this pattern are then saved with the entire pattern entity as a new knowledge base entity.

"define elastic line thinning"—the user selects this icon or menu item and is prompted to select one or more elastic control dots on or near the pattern entity lines, curved lines, etc., to be thinned. The user then moves the elastic control dots to cause the pattern's lines, curved lines, etc., to become thinner. One or more thinning operations may be defined on a pattern entity. When the user chooses the "save as knowledge base entity" icon or menu item, the thinning motion(s) just defined by the user for this pattern are then saved with the entire pattern entity as a new knowledge base entity.

"define elastic bend"—the user selects this icon or menu item and is prompted to select one or more elastic control dots on or near the pattern entity lines, curved lines, etc., to be bent. The user then moves the elastic control dots to cause the character pattern lines, curved lines, etc., to become bent. One or more bending operations may be defined on a pattern entity. When the user chooses the "save as knowledge base entity" icon or menu item, the bending motion(s) just defined by the user for this pattern are then saved with the entire pattern entity as a new knowledge base entity.

"define elastic sway movement"—the user selects this icon or menu item and is prompted to select one or more elastic control dots on or near the pattern entity lines, curved lines, etc., to go through a swaying motion. The user then moves the elastic control dots to cause the pattern's lines, curved lines, loops, etc., to sway back and forth. One or more swaying operations may be defined on a pattern entity. When the user chooses the "save as knowledge base entity" icon or menu item, the swaying motion(s) just defined by the user for this pattern are then saved with the entire pattern entity as a new knowledge base entity.

If enough processors exist, they can be arranged in an XYZ coordinate system grid of processors where a dot pattern can be loaded into the grid of processors to undergo elastic manipulations and other multidimensional linked list functionalities.

Figure 18:
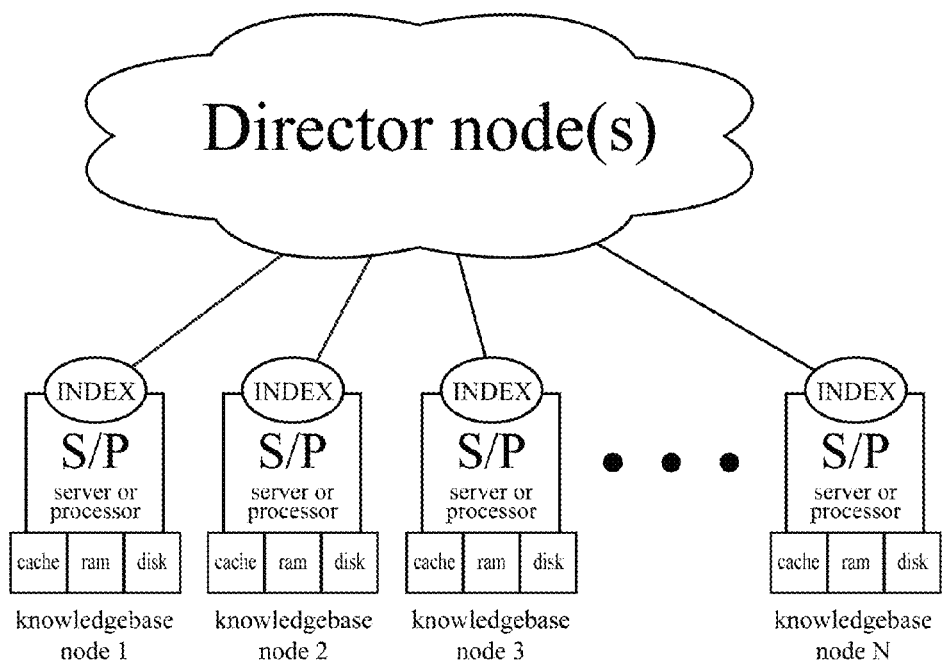
FIG. 18 is an overview of director node management of matching workload.

The knowledge base 30 may be implemented using single or distributed parallel processing and storage or a cluster of servers called knowledge base 30 server/processor nodes as illustrated in FIG. 18. Each knowledge base 30 server node has its own dedicated cache, RAM and solid state or traditional rotational platter disk storage, or in the future may be implemented as a cluster of (such as) many Intel 80 (or more cores) Core Processor chips, each having 80 floating point processors on each chip where each processor has its own dedicated cache, RAM, and storage whether it is solid state storage or traditional rotational platter disk storage. The pattern matching workload may be divided up between knowledge base 30 nodes by the director node 24 or nodes as shown in FIG. 18.

The director nodes 24 control the distribution of the pattern match requests to a single knowledge base 30 node or processor or simultaneously to a number of knowledge base 30 nodes. Typically, each knowledge base 30 node contains a unique part or portion of the overall knowledge base 30 pattern and attribute/metadata database, except there may be secondary knowledge base 30 nodes that mirror primary knowledge base 30 nodes for fault tolerant purposes. Knowledge base nodes 30 contain a unique portion of the knowledge base 30 database, thereby distributing the database across many nodes. The more knowledge base 30 nodes that exist, the faster a flat non-indexed database search can take place. If enough knowledge base 30 nodes exist, indexing may be seldom if ever needed and flat database searches can be used, which often provides better recognition accuracy.

Figure 21:
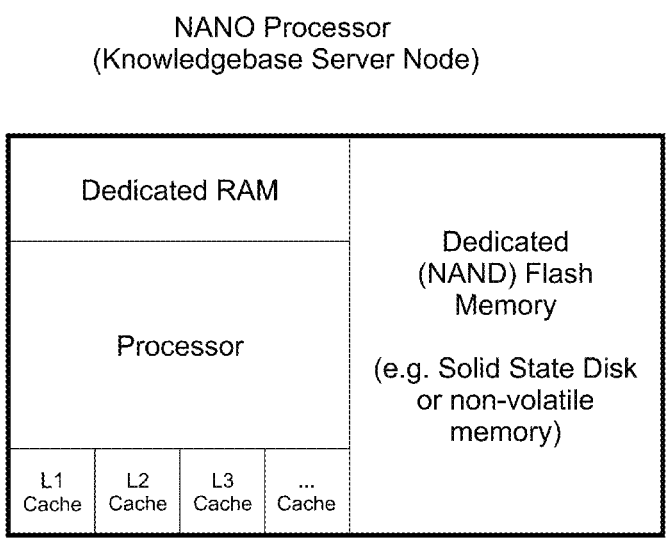
FIG. 21 depicts an exemplary NANO Processor hardware method of design for a knowledge base nano server node according to one embodiment.

FIG. 21 depicts a NANO Processor design that may meet the needs of the massive knowledge base disclosed. FIG. 20 shows one or more, preferably many more, Knowledge Base Nodes 40 in which the NANO Processor node design of FIG. 21 may be used. Though mirror nodes are not shown in FIG. 20 to mirror each knowledge base node 40, such mirror nodes are nevertheless implied to exist as they normally do in data center designs. Hence, the knowledge base 30 of FIG. 20 may contain one, or many more NANO Processor nodes as shown in FIG. 21 to act as primary Knowledge Base Nodes 40, with one or more NANO Processor nodes acting as a mirror nodes, where one or more mirror NANO Processor nodes (FIG. 21) may be present and stand behind each primary knowledge base node 40 as a fault tolerant backup in case of failure of a primary knowledge base node 40.

Another embodiment is that mirror NANO Processor nodes may also be searched, allowing multiple knowledge base wide flat database searches to occur simultaneously. And, the greater the number of mirror NANO Processor nodes for each primary node, the greater the number of simultaneous knowledge base searches that can take place. For example, there may be one million (1,000,000) primary knowledge base NANO nodes in the knowledge base, where each primary NANO node contains a unique portion of the knowledge base, where as many as 100,000 mirror NANO nodes mirrors each primary node, giving a total of 100 billion total knowledge base nodes (primaries plus mirrors), where the knowledge base itself would be duplicated 100,001 times—in massive parallel fashion. FIG. 21 shows a design of a nano node which has sufficient caches, RAM, and high-speed flash memory to support the present method's knowledge base 30. Today, it is possible to build a one million NANO Processor server node 40 knowledge base 30 in a cluster of rack mounted server blade circuit boards. This is possible today by installing 1000 such blades in a centrally located computing center. Such blades may very soon become commercially available. They have been in prototype for the last two years.

Inside each NANO node, the ratio of knowledge base entity data per NANO node may be calculated so that a pattern match between an unknown pattern and all the known patterns on a NANO node is sufficiently fast to insure an acceptable response time to director nodes.

Pattern match requests to the knowledge base 30 may take the form of (a) submitting an entire cut character or word pattern to be matched, (b) submitting progressively cut partial character or word patterns to be matched along with a request that possible character code matches be returned, (c) submitting a partially cut dot pattern to be matched along with a request to find and return full or partial pattern ReadLookAhead matches also described as forecast match possibilities used to guide the character cutting process as to where to cut image pixel/dots next and (d) submitting partially cut dot patterns that are being thresholded along with a request that the knowledge base return additional threshold pattern possibilities along with their associated character code, or in the case of a word pattern, character codes. The director node 24 process may reside on a single machine or processor or on a distributed parallel cluster of machines, multi-processors, or servers as well as NANO Processor nodes. The director nodes create a pattern match request or ReadLookAhead progressive feedback request and may multicast it to all knowledge base work servers, multi-processors or it may send it to specific selected work servers due to the director node's 24 indexing.

Each knowledge base 30 server node or processor performs optimized parallel and sequential searches within its own node's data store to search its entire inner domain for a pattern match and returns its highest probable match or matches to the director node 24 process whether these searches are indexed or un-indexed. Knowledge base 30 nodes may organize pattern entities into several stacks of patterns where each stack contains multiple patterns that are the most similar to one another. For example, stack number 1 may contain hand-written upper case letter 'A's where all letters are tall and narrow and where the most frequently matched letter is the first referenced on the top of the stack.

All stacks have the most referenced patterns at the top of that respective stack to be referenced first with match attempts. Then, stack number 2 may contain more upper case letter 'A's, but they are tall and wide instead of narrow. Then, stack number 3 may contain more upper case letter 'A's, but they are shorter and narrow. Then, stack number 4 may contain more upper case letter 'A's, but they are shorter and wider. Then when the knowledge base node looks for a match, it only has to compare the first pattern or most referenced pattern in each stack and if it is the closest match then it will compare and match further down the stack for the best match. If the first pattern in the stack returns a lower probability match, then it may make no sense to try matching with any others in that particular stack since they are all so similar to one another in that particular stack. The key in this context is that the patterns should be very similar to one another yet still unique. Each knowledge base entity may have a counter of how many times it created a match. These knowledge base 30 server nodes may search sequentially or may search in parallel and all return their best probable match or matches or high probability confirmed search results to the director process nodes 24.

Confidence thresholds may be used to distinguish matches from non-matches. Confidence thresholds may be determined by the number of dot/pixel over-runs, under-runs, direct matches, and may have other criteria. As the knowledge base grows in number of unique pattern entities, the confidence threshold tolerances may be tightened, allowing higher confidence (higher tolerance) matches to take place. Flat database searches into the knowledge base means that an unknown pattern is compared with every knowledge base pattern entity that exists in the knowledge base. This is an exhaustive pattern matching operation but insures that the correct match if one exists will be found. Indexed searches run the risk of eliminating the correct match solution. When flat database searches are performed, the director node or nodes may broadcast the unknown pattern to all knowledge base nodes. Each knowledge base node then tries to find a match in its pattern entity database. If a knowledge base node's recognition engine finds no match that meets the match tolerance metric then it does not respond back to the director node that sent the match request, or may return a no match found, or may return a closest match found, perhaps with a low confidence indication.

The director node treats a non-reply from a knowledge base node to mean it found no match. If all knowledge base nodes do not find a match, then the dot cutting process continues to cut other possible shapes and repeats the process of querying the knowledge base for a match with each new cut pattern. If the cutting process runs out of options then the cutting process within the director node flags this area of the image file to be presented to the user for manual cutting and recognition. Knowledge base nodes typically do not save exact dot for dot duplicates of dot patterns, but usually save all unique dot patterns as a unique entity even if they differ from an existing pattern entity by only one dot or pixel.

The director process nodes 24 keep track of the response times of each knowledge base 30 server node 40 or the knowledge base server nodes 40 may keep track of their own response times. If one knowledge base 30 server node 40 has an average response time that is slower than all others then the director process 24 may send a "divide" command to that slower knowledge base 30 server node 40 along with the node addresses of other empty or less used, non-used or non-populated knowledge base 30 server nodes 40 for it to divide its data with as well as create a new mirror node. Alternatively, the knowledge base server node 40 may initiate its own divide command. The slower knowledge base 30 server node's data then gets divided onto two other nodes, two primary and two mirrors—thus distributing the knowledge base 30 load across more servers and processors. With sufficient processing power, the director process 24 may divide up the load of one knowledge base 30 server processor between two or more additional processors. This reduces the knowledge base 30 size and work load on a single knowledge base node 40 or processor and decreases pattern match response times.

Figure 19:
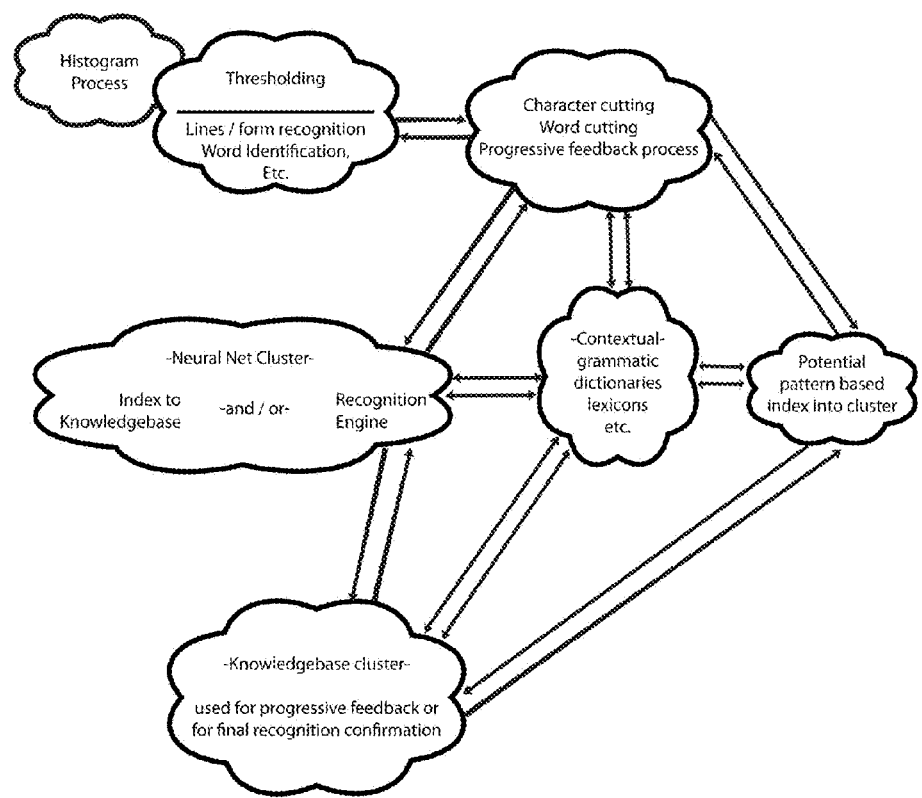
FIG. 19 depicts an exemplary process flow according one embodiment

FIG. 19 depicts one embodiment of how the different processes of the handwriting, machine print, and hand print recognition system can work together. The histogram process finds and records changes in grayscale values across an image file. With these changes recorded in arrays or other variables within software, the thresholding process begins analyzing these slight or greater changes to determine where the background ends and the text, lines and other images begins. Then lines and form recognition and text identification can begin to take place. Cut characters and word patterns or partial patterns can then be fed to the knowledge base 30 directly or via the indexes whether the index is a neural net cluster index or a pattern-based index into the knowledge base 30 cluster.

These patterns or partial patterns can then be matched in the knowledge base nodes 40 or cluster 30 where the closest matches are returned along with progressively fed back forecasting ReadLookAhead patterns for the cutting process to be guided with in cutting the next image dots to complete the character or word being cut whether it is machine print or handwritten or hand printed. As patterns are beginning to be recognized, the need for contextual attribute knowledge will increase and therefore the cutting process as well as the neural net and pattern based indexes and knowledge base cluster 30 will all reference this context information as the cutting process progresses. As noted before, this is just one embodiment of how the recognition system's processes may communicate and work together.

Ink bleed simulates the bleeding of ink through page fibers or textures and deals with pattern entities such as machine print ink bleed, hand print ink bleed, and handwriting characters/words ink bleed. It may be implemented with a knowledge base 30 of stored page fibers or textures that supply the patterns for ink to travel across as the software simulates ink traveling or bleeding across a page. Ink bleed is similar to elasticity in that it modifies the shape of a character pattern entity within specified degrees of freedom in order to create a pattern match while retaining the Unicode or other code identity of the pattern entity.

Ink bleeding can be reversed by finding the centerline of the machine print characters, hand printed characters or words, or cursive hand written characters or words. Once the centerline is found then the outer dots or pixels can be eroded away or deleted from the outer periphery of the character or word towards the centerline of the character, characters, or words, whether handwritten or machine printed or hand printed. This deletion of dots continues until all dots are deleted up to the centerline or center curve. Any further deletion would result in the entire character or word being removed, which is not desirable.

In another embodiment, a robotics knowledge base stores sight images and sound wave images, such as language and other sounds that may occur in the world with their associated Unicode or other code values belonging thereto. For example there may be Unicode or other code values of the words that describe the sound if it is a spoken language and also Unicode or other code values for sound descriptions, sight descriptions, smell descriptions, etc. Many knowledge base 30 images involving robotic mechanical movements for robotic arms, joints, and other appendages and internal functionalities along with knowledge base 30 repositories of the terrain in which a robot is placed to act for itself, to allow for mechanical coordination of movements to maintain and keep balance and to act upon its terrain or other environment it finds itself in. All this may be implemented with multi-dimensional linked lists with degrees of freedom for mechanical movements, and other functionalities mentioned herein regarding robots. Again such robotic functionalities can be interfaced with external data sources.

Although particular embodiments have been described, those of skill in the art will appreciate that various modifications and changes may be made by those skilled in the art without departing from the spirit and scope of the invention.

The invention claimed is:

1. A method of pattern recognition comprising the steps of:
generating a data store containing a set of known patterns having known attributes;
distributing a predetermined portion of the data store to at least one processor, each processor having its own memory and storage, a predetermined portion of the data store being copied into the memory and storage of each processor;
a director node having a communications path to at least one of the processors, the director node having the ability to distribute at least one unknown pattern to at least one of the processors;
loading a digital pattern recognition engine on at least one of the processors, the engine having the ability to compare a first known pattern from the data store with an unknown pattern distributed to the processor from the director node to determine whether the patterns constitute a match based on predetermined criteria;
if the comparison indicates a match, communicating to the director node that the unknown pattern matches the known pattern or a portion thereof, granting selected attributes of the known pattern and selected attributes identified by the engine to the unknown pattern, and storing the unknown pattern as a known pattern in the data store with the granted attributes if the unknown pattern meets predetermined variance criteria;
if the comparison does not indicate a match, performing at least one of:
flagging the unknown pattern;
communicating that the comparison did not indicate a match;
transmitting the unknown pattern to a user for manual identification;
transmitting the unknown pattern to a director node for further processing; or
storing the unknown pattern for further processing.

2. The method of claim 1 further comprising the step of thresholding the unknown pattern.

3. The method of claim 1 wherein the known attributes include at least one of a predetermined code value, an affinity node, a repulsion node, pixelation, degree of elastic motion, resolution, character size, and pixel size.

4. The method of claim 1 wherein the predetermined criteria include at least one of a percentage of matching pixels in the respective patterns, an allowable pixel underrun or an allowable pixel overrun.

5. The method of claim 1 wherein the further processing includes use of pattern cutting.

6. The method of claim 1 further comprising a plurality of mirrored database nodes, each containing a predetermined portion of information from the data store.

7. The method of claim 6 further comprising a step of searching and comparing patterns against a plurality of the mirrored database nodes, to allow simultaneous multiple knowledge base database searches and comparisons.

* * * * *